(12) United States Patent
Cagle et al.

(10) Patent No.: US 11,001,724 B2
(45) Date of Patent: May 11, 2021

(54) INKJET INK COMPOSITION AND INKJET CARTRIDGE

(71) Applicant: Hewlett-Packard Development Company, L.P., Spring, TX (US)

(72) Inventors: Phillip C. Cagle, San Marcos, CA (US); David Michael Ingle, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 106 days.

(21) Appl. No.: 16/332,274

(22) PCT Filed: Jan. 31, 2017

(86) PCT No.: PCT/US2017/015899
§ 371 (c)(1),
(2) Date: Mar. 11, 2019

(87) PCT Pub. No.: WO2018/143957
PCT Pub. Date: Aug. 9, 2018

(65) Prior Publication Data
US 2019/0233667 A1    Aug. 1, 2019

(51) Int. Cl.
| | | |
|---|---|---|
| C09D 11/322 | (2014.01) | |
| B41J 2/14 | (2006.01) | |
| C09D 11/10 | (2014.01) | |
| C09D 11/30 | (2014.01) | |
| C09D 11/106 | (2014.01) | |
| B41M 7/00 | (2006.01) | |

(52) U.S. Cl.
CPC .......... *C09D 11/322* (2013.01); *B41J 2/1404* (2013.01); *C09D 11/10* (2013.01); *C09D 11/106* (2013.01); *C09D 11/30* (2013.01); *B41J 2002/14467* (2013.01); *B41J 2202/12* (2013.01); *B41M 7/009* (2013.01)

(58) Field of Classification Search
CPC .......... B41J 2/1404; B41J 2002/14467; B41J 2202/12; B41M 7/009; C09D 11/322; C09D 11/10; C09D 11/30; C09D 11/106
See application file for complete search history.

(56) References Cited

U.S. PATENT DOCUMENTS

| | | | |
|---|---|---|---|
| 3,437,502 A | 4/1969 | Warner | |
| 4,186,178 A | 1/1980 | Oberlander | |
| 4,495,238 A | 1/1985 | Adiletta | |
| 4,630,076 A | 12/1986 | Yoshimura | |
| 5,990,202 A | 11/1999 | Nguyen et al. | |
| 6,184,268 B1 | 2/2001 | Nichols et al. | |
| 6,302,536 B1 | 10/2001 | Sarma et al. | |
| 6,498,202 B1 | 12/2002 | Sun et al. | |
| 6,709,095 B2 | 3/2004 | Sago et al. | |
| 6,779,884 B1 | 8/2004 | Ma et al. | |
| 6,783,580 B2 | 8/2004 | Tyvoll et al. | |
| 6,906,019 B2 | 6/2005 | Nitzan et al. | |
| 6,936,648 B2 | 8/2005 | Bagwell et al. | |
| 7,129,284 B2 | 10/2006 | Ma et al. | |
| 7,246,896 B2 | 7/2007 | Askeland et al. | |
| 7,388,040 B2 | 6/2008 | Sader et al. | |
| 7,696,262 B2 | 4/2010 | Cagle et al. | |
| 7,744,205 B2 | 6/2010 | Sarkisian et al. | |
| 8,113,643 B2 | 2/2012 | Sarkisian et al. | |
| 8,114,923 B2 | 2/2012 | Sarkisian et al. | |
| 8,267,505 B2 | 9/2012 | Jolly et al. | |
| 8,440,742 B2 | 5/2013 | Cagle et al. | |
| 8,540,358 B2 | 9/2013 | Mozel et al. | |
| 8,746,869 B2 | 6/2014 | Matsuyama et al. | |
| 8,777,390 B2 | 7/2014 | Bruinsma et al. | |
| 8,783,842 B2 | 7/2014 | Ingle et al. | |
| 8,801,162 B2 | 8/2014 | Matsumoto et al. | |
| 8,857,962 B2 | 10/2014 | Goto et al. | |
| 9,062,217 B2 | 6/2015 | Gotou et al. | |
| 9,133,355 B2 | 9/2015 | Brandstein et al. | |
| 9,187,667 B2 | 11/2015 | Doumaux et al. | |
| 9,278,515 B2 | 3/2016 | Sarkisian et al. | |
| 2003/0087991 A1 | 5/2003 | Engel et al. | |
| 2004/0063809 A1 | 4/2004 | Fu et al. | |
| 2004/0166252 A1 | 8/2004 | Takashima et al. | |
| 2005/0176847 A1 | 8/2005 | Cagle | |
| 2005/0206705 A1 | 9/2005 | Ma et al. | |
| 2006/0092251 A1 | 5/2006 | Prasad et al. | |

(Continued)

FOREIGN PATENT DOCUMENTS

| | | |
|---|---|---|
| EP | 0728779 | 8/1996 |
| EP | 1403341 | 3/2004 |

(Continued)

OTHER PUBLICATIONS

ChemSpider bulletin for Glycereth-3, www.chemspider.com/Chemical-Strucutre.80131.html, date unknown.*
Author unknown, bulletin for Glycereth-3, www.thegoodscentcompany.com/data/rw1300121.html, date unknown.*
Disperal®/Dispal® High Purity Dispersible Alurninas, Sasol, Jan. 2003, 10 pages < http://www.sasoltechdata.com/tds/DISPERAL_DISPAL.pdf >.
International Search Report and Written Opinion for International Application No. PCT/US2017/015899 dated Oct. 10, 2017, 8 pages.

*Primary Examiner* — Patrick D Niland

(74) *Attorney, Agent, or Firm* — Dierker & Kavanaugh PC

(57) ABSTRACT

Described herein is an inkjet ink composition and an inkjet cartridge comprising an inkjet ink composition and an ink ejection device comprising a recirculation system. The inkjet ink composition may comprise a latex polymer and an ink vehicle. The ink vehicle comprising water and a co-solvent comprising a solvent having a boiling point in the range of about 170° C. to about 215° C. and a solvent having a boiling point of about 220° C. or more.

11 Claims, 3 Drawing Sheets

(56) References Cited

U.S. PATENT DOCUMENTS

| | | |
|---|---|---|
| 2007/0084380 A1 | 4/2007 | Cagle et al. |
| 2009/0246377 A1 | 10/2009 | Robertson et al. |
| 2009/0295847 A1 | 12/2009 | Mukai et al. |
| 2010/0173077 A1 | 7/2010 | Ming |
| 2010/0231671 A1 | 9/2010 | Anton et al. |
| 2011/0001779 A1 | 1/2011 | Kida |
| 2011/0071249 A1 | 3/2011 | Bui et al. |
| 2011/0234689 A1 | 9/2011 | Saito |
| 2011/0303113 A1 | 12/2011 | Sarkisian et al. |
| 2011/0318551 A1 | 12/2011 | Nakagawa |
| 2012/0092413 A1 | 4/2012 | Kawamura |
| 2013/0072614 A1 | 3/2013 | Lindstrom et al. |
| 2013/0079447 A1 | 3/2013 | Koike |
| 2013/0201252 A1 | 8/2013 | Namba |
| 2013/0222503 A1 | 8/2013 | Okuda |
| 2013/0330526 A1 | 12/2013 | Song |
| 2014/0141212 A1 | 5/2014 | Fu et al. |
| 2014/0204155 A1 | 7/2014 | Vanbesien |
| 2014/0220314 A1* | 8/2014 | Wu ............... C09D 11/101 428/196 |
| 2014/0220315 A1 | 8/2014 | Zhang et al. |
| 2015/0225586 A1 | 8/2015 | Ingle et al. |
| 2015/0252205 A1 | 9/2015 | Sarkisian et al. |
| 2015/0267073 A1 | 9/2015 | Zhou et al. |
| 2015/0273853 A1 | 10/2015 | Govyadinov et al. |
| 2015/0275007 A1 | 10/2015 | Cagle et al. |
| 2015/0283828 A1 | 10/2015 | Aoai et al. |
| 2015/0368488 A1 | 12/2015 | Robello et al. |
| 2016/0185124 A1 | 6/2016 | Govyadinov |
| 2016/0257154 A1 | 9/2016 | Miyamachi et al. |
| 2016/0312404 A1 | 10/2016 | Pan et al. |
| 2016/0319147 A1 | 11/2016 | Chen et al. |
| 2016/0326391 A1 | 11/2016 | Doumaux et al. |
| 2016/0333209 A1 | 11/2016 | Shimono et al. |
| 2017/0355867 A1 | 12/2017 | Kasperchik |
| 2019/0225828 A1* | 7/2019 | Cagle ............... B41M 5/0017 |

FOREIGN PATENT DOCUMENTS

| | | |
|---|---|---|
| EP | 1403342 | 3/2004 |
| EP | 1561788 | 8/2005 |
| EP | 1586454 | 10/2005 |
| EP | 1403346 | 11/2006 |
| EP | 1923435 | 5/2008 |
| EP | 2508577 | 10/2012 |
| EP | 2621731 | 8/2013 |
| JP | 2005126466 | 5/2005 |
| JP | 2014091795 | 5/2014 |
| JP | 2014240451 | 12/2014 |
| RU | 2588245 | 6/2016 |
| SU | 891732 | 12/1981 |
| WO | WO-2003031191 | 4/2003 |
| WO | WO-2007112337 | 10/2007 |
| WO | WO 2009128833 | 10/2009 |
| WO | WO-2011028201 | 3/2011 |
| WO | WO 2011/146069 | * 11/2011 |
| WO | WO-2012008978 | 1/2012 |
| WO | WO-2014042653 | 3/2014 |
| WO | WO 2015023274 | 2/2015 |
| WO | WO 2015041702 | 3/2015 |
| WO | WO 2015134020 | 9/2015 |
| WO | WO 2015142335 | 9/2015 |
| WO | WO 2016092309 | 6/2016 |
| WO | WO-2016130158 | 8/2016 |
| WO | WO-2016175738 | 11/2016 |
| WO | WO-2017009601 | 1/2017 |
| WO | WO-2017014747 | 1/2017 |
| WO | WO-2018143957 | 8/2018 |

* cited by examiner

INKJET INK COMPOSITION AND INKJET CARTRIDGE

BACKGROUND

Inkjet printing with aqueous inks is increasingly being used to print on non-porous flexible and rigid media for signage and other printing applications. It is recognized that inkjet printing of aqueous inks on nonporous media is substantially different than inkjet applications for traditional porous paper-based media. On porous papers, ink drying occurs primarily by ink penetration into the media pore structure, and control of image quality aspects is a strong function of the rate of ink penetration into the media. Thus, optimization of the penetration rate is used for attributes such as optical density and color-to-color bleed. On nonporous media, there is no penetration of the ink into the media, i.e. the colorant remains on the surface of the media, and image quality defects resulting from wetting and ink migration across the nonporous surface are more difficult to control, especially at high printing speeds.

Durability of aqueous inks on nonporous substrates poses a challenge. Inks need to wet and adhere to a broad range of substrates, have good abrasion and scratch resistance, resist attack by water, cleaning fluids, and solvents, and have good outdoor weatherability. There have been great improvements in the durability of aqueous ink-jet inks through incorporation of certain ink-jet compatible latex polymer dispersions made by emulsion polymerization. When printed as part of an ink-jet ink, a latex component of the ink can form a film on a media surface, entrapping and protecting the colorant within the hydrophobic print film.

In order to form a latex film on a media surface, a latex ink composition deposited on the media surface is heated to remove water and other solvents from the ink composition such that the latex component is cured.

DETAILED DESCRIPTION

Figure 1:
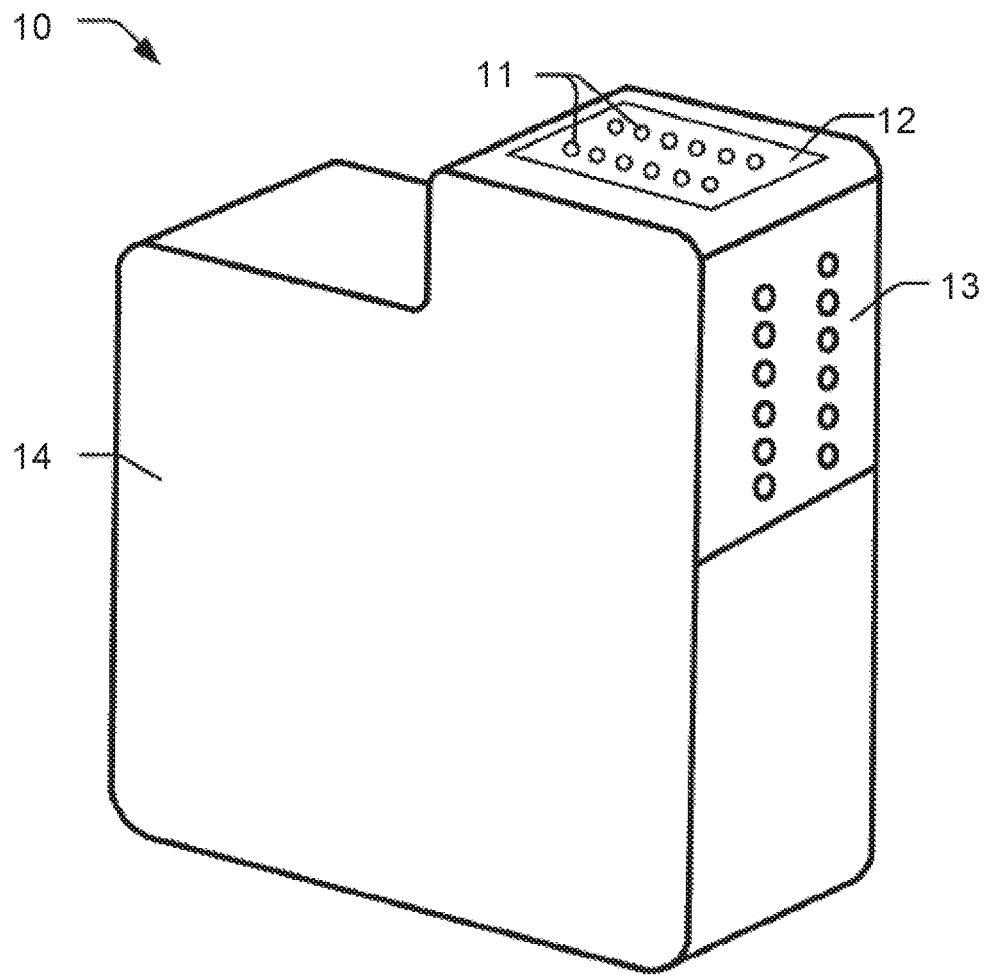
FIG. 1 shows a perspective view of an example of an inkjet cartridge.

Before the latex polymers, ink compositions, methods and related aspects of the disclosure are disclosed and described, it is to be understood that this disclosure is not restricted to the particular process features and materials disclosed herein because such process features and materials may vary somewhat. It is also to be understood that the terminology used herein is used for the purpose of describing particular examples. The terms are not intended to be limiting because the scope is intended to be limited by the appended claims and equivalents thereof.

It is noted that, as used in this specification and the appended claims, the singular forms "a," "an," and "the" include plural referents unless the context clearly dictates otherwise.

As used herein, "co-polymer" refers to a polymer that is polymerized from at least two monomers.

A certain monomer may be described herein as constituting a certain weight percentage of a polymer. This indicates that the repeating units formed from the said monomer in the polymer constitute said weight percentage of the polymer.

If a standard test is mentioned herein, unless otherwise stated, the version of the test to be referred to is the most recent at the time of filing this patent application.

As used herein, the term "about" is used to provide flexibility to a numerical range endpoint by providing that a given value may be a little above or a little below the endpoint. The degree of flexibility of this term can be dictated by the particular variable.

As used herein, "latex," "latex polymer," or "latex particles" refer to the polymeric masses synthesized from individual monomers, which can be dispersed in a liquid vehicle forming a latex dispersion. The term "latex" generally refers to liquid and polymeric particles that are dispersed within the liquid. However, when a latex (i.e. a latex dispersion including latex polymer particles) is formulated within an ink, the liquid becomes part of the liquid vehicle of the ink, and thus, latex polymer can be described based on the latex particle or latex polymer solids that remain dispersed in the liquid vehicle.

The term "monomer emulsion" refers to an organic monomer or monomer mix that is emulsified in an aqueous or water phase. Once the organic monomer or monomer mix is polymerized, a latex polymer dispersion is formed.

The term "latex polymer dispersion" or "latex dispersion" includes both latex particulates as well as the aqueous medium in which the latex particulates are dispersed. More specifically, a latex dispersion is a liquid suspension comprising a liquid (such as water and/or other liquids) and polymeric particulates from 20 nm to 500 nm (preferably from 100 nm to 300 nm) in size (average particle size), and having a weight average molecular weight from about 10,000 Mw to 2,000,000 Mw (preferably from about 100,000 Mw to 300,000 Mw). Such polymeric particulates can comprise a plurality of monomers that are typically randomly polymerized, and can also be crosslinked. When crosslinked, the molecular weight can be even higher than that cited above. The average particle size (e.g. volume or intensity weighted average particle size) may be determined by dynamic light scattering.

The term "non-porous" when referring to a substrate, such as a media substrate, includes surfaces that can have relatively poor water permeability and absorption. Vinyl, polypropylene, polyethylene and other plastic sheets or films, metals, coated offset media, glass, certain woods, and other similar substrates are considered to be non-porous. The term "non-porous media" refers to print media which has a Bristow Test of less than 2 ml/m$^2$ at a contact time of less than 0.5 s. The Bristow Test is known in the art and is summarized below. A test specimen of defined dimensions is affixed to the smooth rim of a wheel free to rotate at a defined constant speed in contact with a stationary test fluid applicator pressing against the test specimen with a defined pressure. The test fluid applicator consists of a test solution storage compartment affixed above a 1 by 15-mm test fluid delivery slot, the slot being positioned so that the long dimension is perpendicular to the direction of rotation of the rim of the wheel, and parallel to the wheel axis. A defined quantity of test fluid is placed through the fluid reservoir, onto the fluid delivery slot. With the wheel with the test specimen affixed rotating at constant speed, the test solution applicator is brought into contact with the rotating test specimen and held in place under defined pressure. The test fluid is transferred from the test solution applicator onto the test specimen in a band whose width, controlled by the applicator slot width is approximately 15 mm, and whose length is function of the absorptive characteristics of the test fluid interaction with the test specimen under the defined test conditions. The amount of liquid absorbed per unit area of test specimen is calculated from the volume of test fluid originally placed in the applicator, and the average width and length of the band created on the test specimen by the transferred test fluid. The time available for the liquid absorption is calculated from the volume of test fluid originally placed in the applicator and applicator geometry.

Low energy surface media include polyolefinic media (polypropylene or polyethylene). These media may be factory modified to facilitate wetting by inks (e.g. aqueous inkjet inks); generally, this modification increases the surface energy, but relative to other substrates they remain 'low'. Surface energy, for example surface energy with respect to aqueous inks, may be measured by contact angle between the substrate and water. In some examples, a low energy surface media is a media (i.e. print substrate) having a surface energy of less than about 40 dyne/cm, for example less than about 35 dyne/cm. The surface energy of a print substrate may be measured according to ASTM D2578.

As used herein, "ink vehicle" refers to the liquid fluid in which a latex polymer and a pigment are placed to form an ink. Ink vehicles may include a mixture of a variety of different agents, including, for example, surfactants, solvents, co-solvents, buffers, biocides, viscosity modifiers, sequestering agents, stabilizing agents, humectants and water.

The term "decap" is a measure of how long a printing nozzle may remain inactive before plugging and how many inkjet architecture firings are required to re-establish proper drop ejection.

The term "(meth)acrylate" is well understood in the art to refer to both acrylates and methacrylates. For example, "cyclohexyl (meth)acrylate" refers to cyclohexyl acrylate and/or cyclohexyl methacrylate. Likewise, the term "cycloaliphatic (meth)acrylate monomer" denotes a cycloaliphatic acrylate monomer and/or a cycloaliphatic methacrylate monomer; and the term "aromatic(meth)acrylate monomer" denotes an aromatic acrylate monomer and/or an aromatic methacrylate monomer.

The term "(meth)acrylamide" is well understood in the art to refer to both acrylamides and methacrylamides. For example, the term "cycloaliphatic (meth)acrylamide monomer" denotes a cycloaliphatic acrylamide monomer and/or a cycloaliphatic methacrylamide monomer; and the term "aromatic (meth)acrylamide monomer" denotes an aromatic acrylamide monomer and/or an aromatic methacrylamide monomer.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not just the numerical values explicitly recited as the end points of the range, but also to include all the individual numerical values or sub-ranges encompassed within that range as if each numerical value and sub-range is explicitly recited. As an illustration, a numerical range of "about 1 wt % to about 5 wt %" should be interpreted to include not just the explicitly recited values of about 1 wt % to about 5 wt %, but also include individual values and subranges within the indicated range. Thus, included in this numerical range are individual values such as 2, 3.5, and 4 and sub-ranges such as from 1-3, from 2-4, and from 3-5, etc. This same principle applies to ranges reciting a single numerical value. Furthermore, such an interpretation should apply regardless of the breadth of the range or the characteristics being described.

Unless otherwise stated, any feature described herein can be combined with any aspect or any other feature described herein.

The present inventors have found difficulties with printing some existing latex inkjet inks to some non-porous media, particularly non-porous media with low energy surfaces, such as polypropylene and polyethylene.

The present inventors have found that in order to print on a wide range of non-porous media in-printer ink drying and curing of inkjet compositions should take place at a media temperature of about 70° C. or less, for example about 65° C. or less to avoid media deformation which may occur at higher temperatures. Therefore, the present inventors have sought to provide inkjet ink compositions which can be cured on and adhere to a wide range of substrates, particularly non-porous substrates, e.g. rigid and non-porous substrates, without deformation of the print substrate and which also provide good decap performance and are quick drying. In particular, the present inventors have found that providing inkjet ink compositions having the ink vehicles described herein may be cured at temperatures which prevent deformation of print substrates, such as polyethylene and polypropylene, for example at media temperatures of 65° C. or less. The present inventors have found that by providing inkjet ink compositions with the ink vehicles described herein the minimum film formation temperature (MFFT) of the latex polymer of the inkjet ink composition may be lowered to allow curing of the inkjet ink compositions at lower temperatures.

The present inventors have also found that the ink compositions described herein have low odour.

In an aspect there is provided an inkjet ink composition. The inkjet composition may comprise:
  a latex polymer; and
  an ink vehicle comprising:
    water; and
    a co-solvent comprising:
      a solvent having a boiling point in the range of about 170° C. to about 215° C.; and
      a solvent having a boiling point of about 220° C. or more,
  wherein the inkjet ink composition comprises about 10 wt % to about 40 wt % by total weight of the composition of the solvent having a boiling point in the range of about 170° C. to about 215° C. and about 0.1 wt % to about 8 wt % by total weight of the composition of the solvent having a boiling point of about 220° C. or more.

In an aspect there is provided a method of printing. The method of printing may comprise:
  providing a non-porous print substrate;
  providing an inkjet ink composition comprising a latex polymer and an ink vehicle, wherein the ink vehicle comprises water and a co-solvent comprising a solvent having a boiling point in the range of about 170° C. to about 215° C. and a solvent having a boiling point of about 220° C. or more;

inkjet printing the inkjet ink composition to non-porous print substrate to form an inkjet ink layer disposed on the non-porous print substrate; and heating the ink layer to cure the latex polymer at a temperature such that the temperature of the non-porous print substrate does not exceed a temperature of about 70° C.

In an aspect there is provided an inkjet cartridge. The inkjet cartridge may comprise:

an inkjet ink composition comprising a latex polymer and an ink vehicle comprising water; and a co-solvent comprising a solvent having a boiling point in the range of about 170° C. to about 215° C. and a solvent having a boiling point of about 220° C. or more; and an ink ejection device comprising a recirculation system.

Inkjet Ink Composition

Described herein is an inkjet ink composition. The inkjet ink composition may comprise a latex polymer; and an ink vehicle. In some examples, the inkjet ink composition may comprise a latex polymer, a pigment; and an ink vehicle. In some examples, the ink vehicle comprises water and a co-solvent.

Latex Polymer

The inkjet ink composition comprises a latex polymer.

Latex polymers can be prepared using any of a number of methods known in the art, including but not limited to emulsion polymerization techniques where co-monomers are dispersed and polymerized in a discontinuous phase of an emulsion. The latexes can also be dispersions of polymer prepared by other techniques known to those in the art.

The monomers used in the latexes can be vinyl monomers. In some examples, the monomers from which the latex polymer is formed are selected from vinyl monomers, acrylate monomers, methacrylate monomers, styrene monomers, ethylene, vinyl chloride, vinylidene chloride, maleate esters, furnarate esters, itaconate esters and combinations thereof. In some examples, monomers from which the latex polymer is formed may comprise ethyl acrylate; ethyl methacrylate; benzyl acrylate; benzyl methacrylate; propyl acrylate; propyl methacrylate; iso-propyl acrylate; iso-propyl methacrylate; butyl acrylate; butyl methacrylate; hexyl acrylate; hexyl methacrylate; octadecyl methacrylate; octadecyl acrylate; lauryl methacrylate; lauryl acrylate; hydroxyethyl acrylate; hydroxyethyl methacrylate; hydroxyhexyl acrylate; hydroxyhexyl methacrylate; hydroxyoctadecyl acrylate; hydroxyoctadecyl methacrylate; hydroxylauryl methacrylate; hydroxylauly acrylate; phenethyl acrylate; phenethyl methacrylate; 6-phenylhexyl acrylate; 6-phenylhexyl methacrylate; phenyllauryl acrylate; phenyllauryl methacrylate; 3-nitrophenyl-6-hexyl methacrylate; 3-nitrophenyl-18-octadecyl acrylate; ethyleneglycol dicyclopentyl ether acrylate; vinyl ethyl ketone; vinyl propyl ketone; vinyl hexyl ketone; vinyl octyl ketone; vinyl butyl ketone; cyclohexyl acrylate; methoxysilane; acryloxypropyhiethyldimethoxysilane; trifluoromethyl styrene; trifluoromethyl acrylate; trifluoromethyl methacrylate; tetrafluoropropyl acrylate; tetrafluoropropyl methacrylate; heptafluorobutyl methacrylate; iso-butyl acrylate; iso-butyl methacrylate; 2-ethylhexyl acrylate; 2-ethylhexyl methacrylate; iso-octyl acrylate; iso-octyl methacrylate; and combinations thereof.

In some examples, the latex polymer is formed from monomers selected from styrenes, C1 to C8 alkyl methacrylates, C1 to C8 alkyl acrylates, ethylene glycol methacrylates and dimethacrylates, methacrylic acids, acrylic acids, and combinations thereof. Examples of latex polymers that can be used include those prepared using a monomer emulsion of styrene, hexyl methacrylate, ethylene glycol dimethacrylate, and methacrylic acid, which are copolymerized to form the latex.

In some examples, the monomers from which the latex polymer is formed include acid monomers, such as meth) acrylic acid monomers. Acidic monomers that can be polymerized in forming latexes include, without limitation, acrylic acid, methacrylic acid, ethacrylic acid, dimethylacrylic acid, maleic anhydride, maleic acid, vinylsulfonate, cyanoacrylic acid, vinylacetic acid, allylacetic acid, ethylidineacetic acid, propylidineacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsuccinamidic acid, mesaconic acid, methacroylalanine, acryloylhydroxyglycine, sulfoethyl methacrylic acid, sulfopropyl acrylic acid, styrene sullonic acid, sulfoethylacrylic acid, 2-methacryloyloxymethane-1-sullonic acid, 3-methacryoyloxypropane-1-sulionic acid, 3-(vinyloxy)propane-1-sulfonic acid, ethylenesulfonic acid, vinyl sulfuric acid, 4-vinylphenyl sulfuric acid, ethylene phosphonic acid, vinyl phosphoric acid, vinyl benzoic acid, 2-acrylamido-2-methyl-1-propanesulfonic acid, combinations thereof, derivatives thereof, and mixtures thereof.

In some examples, the latex polymer comprises a (meth) acrylate or (meth)acrylamide polymer or copolymer. In some examples, the latex polymer comprises a (meth)acrylate or (meth)acrylate copolymer. A (meth)acrylate or (meth) acrylamide copolymer may contain a (meth)acrylate/(meth) acrylamide component in addition to other components, such as other vinyl monomer components. For example, the latex polymer may comprise a copolymer of a (meth) acrylate monomer and another vinyl monomer, for example another vinyl monomer selected from styrenes, C1 to C8 alkyl methacrylates, C1 to C8 alkyl acrylates, ethylene glycol methacrylates and dimethacrylates, methacrylic acids, acrylic acids, and combinations thereof. For example, the latex polymer may comprise a copolymer of a (meth) acrylamide monomer and another vinyl monomer, for example another vinyl monomer selected from styrenes, C1 to C8 alkyl methacrylates, C1 to C8 alkyl acrylates, ethylene glycol methacrylates and dimethacrylates, methacrylic acids, acrylic acids, and combinations thereof.

In some examples, the latex polymer comprises a (meth) acrylate polymer being a polymer comprising (meth)acrylate monomers or a (meth)acrylate copolymer being a copolymer comprising (meth)acrylate monomers. In some examples, the latex polymer comprises a (meth)acrylate copolymer comprising (meth)acrylate monomers.

In some examples, the (meth)acrylate monomers are selected from aliphatic (meth)acrylate monomers, aromatic (meth)acrylate monomers and combinations thereof.

In some examples, aliphatic (meth)acrylate monomers comprise linear aliphatic (meth)acrylate monomers and/or cycloaliphatic (meth)acrylate monomers.

In some examples, linear (meth)acrylate monomers comprise alkyl (meth)acrylate monomers (for example C1 to C8 alkyl (meth)acrylate monomers). In some examples, the linear (meth)acrylate monomers comprise alkyl methacrylate monomers (e.g. C1 to C8 alkyl methacrylate monomers). In some examples, the linear (meth)acrylate monomers comprise alkyl methacrylate monomers (e.g. C1 to C8 alkyl methacrylate monomers) and alkyl acrylate monomers (C1 to C8 alkyl acrylate monomers).

In some examples, the latex polymer comprises a copolymer comprising alkyl (meth)acrylate (e.g. C1 to C8 alkyl (meth)acrylate monomers) and styrene monomers. In some examples, the latex polymer comprises a copolymer comprising alkyl (meth)acrylate (e.g. C1 to C8 alkyl (meth)acrylate monomers), styrene monomers and (meth)acrylic acid monomers.

In some examples, the latex polymer comprises a (meth)acrylamide polymer being a polymer comprising (meth)acrylamide monomers or a (meth)acrylamide copolymer being a copolymer comprising (meth)acrylamide monomers. In some examples, the latex polymer comprises a (meth)acrylamide copolymer comprising (meth)acrylamide monomers.

In some examples, the (meth)acrylamide monomers are selected from aliphatic (meth)acrylamide monomers, aromatic (meth)acrylamide monomers and combinations thereof.

In some examples, aliphatic (meth)acrylamide monomers comprise linear aliphatic (meth)acrylamide monomers and/or cycloaliphatic (meth)acrylamide.

In some examples, linear (meth)acrylamide monomers comprise alkyl (meth)acrylamide monomers (for example C1 to C8 alkyl (meth)acrylamide monomers). In some examples, the linear (meth)acrylamide monomers comprise alkyl methacrylamide monomers (e.g. C1 to C8 alkyl methacrylamide monomers). In some examples, the linear (meth)acrylamide monomers comprise alkyl methacrylamide monomers (e.g. C1 to C8 alkyl methacrylamide monomers) and alkyl acrylamide monomers (C1 to C8 alkyl acrylamide monomers).

In some examples, the latex polymer comprises a copolymer comprising alkyl (meth)acrylamide (e.g. C1 to 08 alkyl (meth)acrylamide) and styrene monomers. In some examples, the latex polymer comprises a copolymer comprising alkyl (meth)acrylamide (e.g. C1 to C8 alkyl (meth)acrylamide monomers), styrene monomers and (meth)acrylic acid monomers.

In some examples, the latex polymer comprises a copolymer comprising cycloaliphatic (meth)acrylate monomers or cycloaliphatic (meth)acrylamide monomers.

The present inventors have found that employing a latex polymer comprising cycloaliphatic (meth)acrylate or (meth)acrylamide monomers in the inkjet ink compositions described herein provides further improvements regarding the curing of the latex polymers on, and adhesion to, a wide range of print substrates.

In some examples, the latex polymer comprises a copolymer comprising aromatic (meth)acrylate monomers or aromatic (meth)acrylamide monomers.

The terms 'cycloaliphatic' and 'aromatic' are well understood by the skilled person.

In some examples, the latex polymer is derived from a composition comprising a cycloaliphatic monomer and an aromatic monomer, wherein the cycloaliphatic monomer comprises a cycloaliphatic (meth)acrylate monomer or a cycloaliphatic (meth)acrylamide monomer and the aromatic monomer comprises an aromatic (meth)acrylate monomer or an aromatic (meth)acrylamide monomer. For example; the latex polymer may comprise a copolymer of a cycloaliphatic monomer and an aromatic monomer, wherein the cycloaliphatic monomer comprises one or more monomers comprising a cycloaliphatic (meth)acrylate monomer or a cycloaliphatic (meth)acrylamide monomer, and the aromatic monomer comprises one or more monomers comprising an aromatic (meth)acrylate monomer or an aromatic (meth)acrylamide monomer. For example, the latex polymer may comprise a copolymer comprising cycloaliphatic monomer units (e.g. cycloaliphatic (meth)acrylate and/or cycloaliphatic (meth)acrylamide units) and aromatic monomer units (e.g. aromatic (meth)acrylate and/or aromatic (meth)acrylamide units).

The present inventors have found that employing a latex polymer comprising a copolymer comprising cycloaliphatic monomers (such as cycloaliphatic (meth)acrylate or (meth)acrylamide monomers) in combination aromatic monomers (such as aromatic (meth)acrylate or (meth)acrylamide monomers) in the inkjet ink compositions described herein provides further improvements regarding the curing of the latex polymers on, and adhesion to, a wide range of print substrates.

In some examples, the cycloaliphatic monomer comprises a cycloaliphatic (meth)acrylate monomer or a cycloaliphatic (meth)acrylamide monomer. In some examples, the cycloaliphatic monomer comprises a cycloaliphatic (meth)acrylate monomer. A cycloaliphatic (meth)acrylate monomer is a monomer comprising a cycloaliphatic moiety bonded to, either directly or indirectly, a (meth)acrylate moiety (e.g. by a carbon chain; for example a substituted or unsubstituted carbon chain, for example a saturated or unsaturated carbon chain, such as a $C_{1-12}$ carbon chain, for example a $C_{1-10}$ carbon chain, a $C_{1-6}$ carbon chain, or a $C_{1-4}$ carbon chain, wherein one or more of the carbon atoms may be replaced by a heteroatom such as oxygen, nitrogen or sulfur, for example oxygen). In some examples, the cycloaliphatic monomer comprises a cycloaliphatic (meth)acrylamide monomer. A cycloaliphatic (meth)acrylamide monomer is a monomer comprising a cycloaliphatic moiety bonded to, either directly or indirectly, a (meth)acrylamide moiety (e.g. by a carbon chain, for example a saturated or unsaturated carbon chain, such as a $C_{1-12}$ carbon chain, for example a substituted or unsubstituted carbon chain, for example a $C_{1-10}$ carbon chain, a $C_{1-6}$ carbon chain, or a $C_{1-4}$ carbon chain, wherein one or more of the carbon atoms may be replaced by a heteroatom such as oxygen, nitrogen or sulfur, for example oxygen).

In some examples, the cycloaliphatic moiety comprises a 5-12 membered aliphatic ring, for example a carbon ring having 5-12 carbon atoms (e.g., a $C_5$-$C_{12}$ ring), or a 5-12 membered heteroaliphatic ring. In some examples, the cycloaliphatic moiety comprises a $C_5$-$C_{12}$ ring, a $C_5$-$C_{12}$ ring may be a single ring (such as cyclopentyl, cyclohexyl or cycloheptyl groups) or a bicyclic ring (such as decalin). In some examples, the cycloaliphatic moiety comprises a 5-10 membered aliphatic ring, for example a 6-10 membered aliphatic ring.

In some examples, the cycloaliphatic moiety comprises a carbon ring having 5-10 carbon atoms (e.g. a $C_5$-$C_{10}$ ring). In some examples, the cycloaliphatic moiety comprises a carbon ring having 6-10 carbon atoms (e.g. a $C_6$-$C_{10}$ ring).

In some examples, the cycloaliphatic moiety comprises a substituent, such as an alkyl, heteroalkyl, alkoxy, hydroxyl, cycloaliphatic or aromatic substituent. In some examples, the cycloaliphatic moiety comprises a substituent, such as an alkyl group (for example a $C_{1-12}$ alkyl group, for example $C_{1-10}$ alkyl group, $C_{1-6}$ alkyl group, $C_{1-4}$ alkyl group, or a methyl group), an aryl group (e.g. a $C_{6-12}$ aryl group, for example $C_{6-10}$ aryl group), a heteroalkyl group (e.g. a $C_{1-12}$ heteroalkyl (such as ether containing group), for example $C_{1-10}$ heteroalkyl, $C_{1-6}$ heteroalkyl, $C_{1-4}$ heteroalkyl (e.g. $C_{1-4}$ ether)). In some examples, the cycloaliphatic moiety is an optionally substituted cycloaliphatic moiety, for example optionally substituted with a $C_{1-12}$ alkyl group.

In some examples, the aromatic monomer comprises an aromatic (meth)acrylate monomer or an aromatic (meth)acrylamide monomer. In some examples, the aromatic monomer comprises an aromatic (meth)acrylate monomer. An aromatic (meth)acrylate monomer is a monomer comprising an aromatic moiety bonded to, either directly or indirectly, a (meth)acrylate moiety (e.g. by a carbon chain, for example a substituted or unsubstituted carbon chain, for example a saturated or unsaturated carbon chain, such as a $C_{1-12}$ carbon chain, for example a $C_{1-10}$ carbon chain, a $C_{1-6}$ carbon chain, or a $C_{1-4}$ carbon chain, wherein one or more of the carbon atoms may be replaced by a heteroatom such as oxygen, nitrogen or sulfur, for example oxygen). In some examples, the aromatic monomer comprises an aromatic (meth)acrylamide monomer. An aromatic (meth)acrylamide monomer is a monomer comprising an aromatic moiety bonded to, either directly or indirectly, a (meth)acrylamide moiety (e.g. by a carbon chain; for example a substituted or unsubstituted carbon chain, for example a saturated or unsaturated carbon chain, such as a $C_{1-12}$ carbon chain, for example a $C_{1-10}$ carbon chain, a $C_{1-6}$ carbon chain, or a $C_{1-4}$ carbon chain, wherein one or more of the carbon atoms may be replaced by a heteroatom such as oxygen, nitrogen or sulfur, for example oxygen).

In some examples, the aromatic moiety comprises a 5-12 membered aromatic ring, for example an aromatic carbon ring having 6-12 carbon atoms (e.g. a $C_6$-$C_{12}$ ring), or a 5-12 membered heteroaromatic ring. In some examples, the aromatic moiety comprises a $C_5$-$C_{12}$ aromatic ring, a $C_5$-$C_{12}$ aromatic ring may be a single aromatic ring (e.g. benzyl or phenyl), or a bicyclic aromatic ring (e.g. naphthyl). In some examples, the aromatic moiety comprises a 5-10 membered aromatic ring, for example a 6-10 membered aromatic ring.

In some examples, the aromatic moiety comprises an aromatic carbon ring having 6-10 carbon atoms (e.g. a $C_6$-$C_{10}$ aromatic ring).

In some examples, the aromatic moiety comprises a substituent, such as an alkyl, heteroalkyl (including an ether containing group), alkoxy, hydroxyl, cycloaliphatic or aromatic substituent. In some examples, the aromatic moiety comprises a substituent. In some examples, the aromatic moiety may be substituted by an alkyl group, (for example a $C_{1-12}$ alkyl group, for example $C_{1-10}$ alkyl group, $C_{1-6}$ alkyl group, $C_{1-4}$ alkyl group, or a methyl group), an aryl group (e.g. a $C_{6-12}$ aryl group, for example $C_{6-10}$ aryl group), a heteroalkyl group (e.g. a $C_{1-12}$ heteroalkyl (such as ether containing group), for example $C_{1-10}$ heteroalkyl, $C_{1-6}$ heteroalkyl, $C_{1-4}$ heteroalkyl (e.g. $C_{1-4}$ ether)). In some examples, the aromatic moiety is optionally substituted, for example optionally substituted with a $C_{1-12}$ alkyl group.

In some example, the cycloaliphatic monomer is a cycloaliphatic monomer having the formula (I)

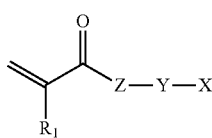

formula (I)

wherein,
$R_1$ is H or methyl;
$Z$ is O or $NR_2$, where $R_2$ is H, alkyl or X';
$Y$ is a bond or a carbon chain, where one or more of the carbon atoms of the carbon chain may be replaced with a heteroatom such as oxygen, sulfur or nitrogen;
$X$ and $X'$ are independently cycloaliphatic moieties.

In some examples $R_2$ is alkyl, for example $C_{1-12}$, $C_{1-10}$, $C_{1-6}$, or $C_{1-4}$ alkyl (e.g. methyl or ethyl). In some examples $R_2$ is an optionally substituted alkyl group. In some examples $R_2$ is H, an optionally substituted alkyl group or X'. In some examples, $R_2$ is H or X'. In some examples, $R_2$ is H.

In some examples, Y is a bond or a saturated or unsaturated carbon chain. In some examples Y is a bond or a $C_{1-12}$, for example $C_{1-10}$, $C_{1-6}$, or $C_{1-4}$ carbon chain. In some examples, one or more of the carbon atoms of the carbon chain represented by Y is replaced with a heteroatom selected from oxygen, sulfur and nitrogen. In some examples, Y is a bond.

In some examples, X is a 5-12 membered ring, for example a carbon ring having 5-12 carbon atoms (e.g. a $C_5$-$C_{12}$ ring), or a 5-12 membered heteroaliphatic ring. In some examples, X is a $C_5$-$C_{12}$ single ring (such as cyclopentyl, cyclohexyl or cycloheptyl groups) or a bicyclic ring (such as decalin).

In some examples, X is a carbon ring having 5-10 carbon atoms (e.g. a $C_5$-$C_{10}$ ring). In some examples, X is a carbon ring having 6-10 carbon atoms (e.g. a $C_5$-$C_{10}$ ring).

In some examples, X is substituted, for example with an alkyl, alkoxy, hydroxyl, heteroalkyl, cycloaliphatic or aromatic substituent. In some examples, X is substituted with an alkyl group (for example a $C_{1-12}$ alkyl group, for example $C_{1-10}$ alkyl group, $C_{1-6}$ alkyl group, $C_{1-4}$ alkyl group, or a methyl group), an aryl group (e.g. a $C_{5-12}$ aryl group, for example $C_{5-10}$ aryl group), a heteroalkyl group (e.g. a $C_{1-12}$ heteroalkyl (such as ether containing group), for example $C_{1-10}$ heteroalkyl, $C_{1-6}$ heteroalkyl, $C_{1-4}$ heteroalkyl (e.g. $C_{1-4}$ ether)). In some examples, X is optionally substituted, for example optionally substituted with a $C_{1-12}$ alkyl group.

In some examples, X' is a carbon ring having 5-12 carbon atoms (e.g. a $C_5$-$C_{12}$ ring), or a 5-12 membered heteroaliphatic ring. In some examples, X' is a $C_5$-$C_{12}$ single ring (such as cyclopentyl, cyclohexyl or cycloheptyl groups) or a bicyclic ring (e.g. a C6 or C10 fused ring, such as decalin).

In some examples, X' is a carbon ring having 5-10 carbon atoms (e.g. a $C_5$-$C_{10}$ ring). In some examples, X' is a carbon ring having 6-10 carbon atoms (e.g. a $C_6$-$C_{10}$ ring).

In some examples, X' is substituted, for example with an alkyl, alkoxy, hydroxyl, heteroalkyl, cycloaliphatic or aromatic substituent. In some examples, X' is substituted with an alkyl group (for example a $C_{1-12}$ alkyl group, for example $C_{1-10}$ alkyl group, $C_{1-6}$ alkyl group, $C_{1-4}$ alkyl group, or a methyl group), an aryl group (e.g. a $C_{5-12}$ aryl group, for example $C_{5-10}$ aryl group), a heteroalkyl group (e.g. a $C_{1-12}$ heteroalkyl (such as ether containing group), for example $C_{1-10}$ heteroalkyl, $C_{1-6}$ heteroalkyl, $C_{1-4}$ heteroalkyl (e.g. $C_{1-4}$ ether)). In some examples, X' is optionally substituted, for example optionally substituted with a $C_{1-12}$ alkyl group.

In some examples, for example when Z is $NR_2$ and $R_2$ is X', X and X' may be the same.

Examples of cycloaliphatic monomers include: cyclohexyl acrylate, cyclohexyl methacrylate, methylcyclohexyl acrylate, methylcyclohexyl methacrylate, trimethylcyclohexyl acrylate, trimethylcyclohexyl methacrylate, and other cycloaliphatic methacrylate and acrylate monomers including ester derivatives of decalinol, hydrogenated bisphenol A and F. In some examples, the latex polymer comprises at least about 50 wt % cycloaliphatic monomers by total weight solids of the latex polymer, for example at least about 55 wt %, or at least about 60 wt % cycloaliphatic monomers by total weight solids of the latex polymer.

In some examples, the latex polymer comprises up to about 95 wt % cycloaliphatic monomers by total weight solids of the latex polymer, for example up to about 90 wt % cycloaliphatic monomers by total weight solids of the latex polymer.

In some examples, the latex polymer comprises from about 50 wt % to about 90 wt %, for example from about 60 wt % to about 90 wt % cycloaliphatic monomers by total weight solids of the latex polymer.

In some example, the aromatic monomer is an aromatic monomer having the formula (II)

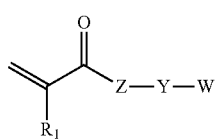

formula (II)

wherein,
$R_1$ is H or methyl;
Z is O or $NR_2$, where $R_2$ is H, alkyl or W';
Y is a bond or a carbon chain, where one or more of the carbon atoms of the carbon chain may be replaced with a heteroatom such as oxygen, sulfur or nitrogen;
W and W' are independently aromatic moieties.

In some examples $R_2$ is alkyl, for example $C_{1-12}$, $C_{1-10}$, $C_{1-6}$, or $C_{1-4}$ alkyl (e.g. methyl or ethyl). In some examples $R_2$ is an optionally substituted alkyl group. In some examples $R_2$ is H, an optionally substituted alkyl group or W. In some examples, $R_2$ is H or W. In some examples, $R_2$ is H.

In some examples, Y is a bond or a saturated or unsaturated carbon chain. In some examples Y is a bond or a $C_{1-12}$, for example $C_{1-10}$, $C_{1-6}$, or $C_{1-4}$ carbon chain. In some examples, one or more of the carbon atoms of the carbon chain represented by Y is replaced with a heteroatom selected from oxygen, sulfur and nitrogen. In some examples, Y is a bond.

In some examples, W is a 5-12 membered aromatic ring, for example a carbon ring having 6-12 carbon atoms (e.g. a $C_6$-$C_{12}$ aromatic ring), or a 5-12 membered heteroaromatic ring. In some examples W comprises a $C_5$-$C_{12}$ aromatic ring, a $C_5$-$C_{12}$ aromatic ring may be a single aromatic ring (e.g. benzyl or phenyl) or a bicyclic aromatic ring (e.g. a fused C6 or C10 aromatic ring, e.g. naphthyl). In some examples, W is a 5-10 membered aromatic ring, for example a 6-10 membered aromatic ring.

In some examples, W is an aromatic carbon ring having 6-10 carbon atoms (e.g. a $C_6$-$C_{10}$ aromatic ring).

In some examples, W is substituted, for example W may be substituted with an alkyl group (for example a $C_{1-12}$ alkyl group, for example $C_{1-10}$ alkyl group, $C_{1-6}$ alkyl group, $C_{1-4}$ alkyl group, or a methyl group),an aryl group (e.g., a $C_{6-12}$ aryl group, for example $C_{5-10}$ aryl group), a heteroalkyl group (e.g. a $C_{1-12}$ heteroalkyl (such as ether containing group), for example $C_{1-10}$ heteroalkyl, $C_{1-6}$ heteroalkyl, $C_{1-4}$ ether). In some examples, W is optionally substituted, for example optionally substituted with a $C_{1-12}$ alkyl group.

In some examples, W is a 5-12 membered aromatic ring, for example a carbon ring having 6-12 carbon atoms (e.g. a $C_6$-$C_{12}$ aromatic ring), or a 5-12 membered heteroaromatic ring. In some examples W' comprises a $C_6$-$C_{12}$ aromatic ring, a $C_6$-$C_{12}$ aromatic ring may be a single aromatic ring (e.g. benzyl or phenyl) or a bicyclic aromatic ring (e.g. a fused C6 or C10 aromatic ring, e.g. naphthyl). In some examples, W is a 5-10 membered aromatic ring, for example a 6-10 membered aromatic ring.

In some examples, W is an aromatic carbon ring having 6-10 carbon atoms (e.g. a $C_6$-$C_{10}$ aromatic ring).

In some examples, W is substituted, for example, W' may be substituted with an alkyl group (for example a $C_{1-12}$ alkyl group, for example $C_{1-10}$ alkyl group, $C_{1-6}$ alkyl group, $C_{1-4}$ alkyl group, or a methyl group),an aryl group (e.g. a $C_{6-12}$ aryl group, for example $C_{6-10}$ aryl group), a heteroalkyl group (e.g. a $C_{1-12}$ heteroalkyl (such as ether containing group), for example $C_{1-10}$ heteroalkyl, $C_{1-6}$ heteroalkyl, $C_{1-4}$ ether). In some examples, W is optionally substituted, for example optionally substituted with a $C_{1-12}$ alkyl group.

In some examples, for example when Z is $NR_2$ and $R_2$ is W and W may be the same.

Examples of aromatic monomers include: 2-phenoxyethyl methacrylate, 2-phenoxyethyl acrylate, phenyl propyl methacrylate, phenyl propyl acrylate, benzyl methacrylate, benzyl acrylate, phenylethyl methacrylate, phenylethyl acrylate, benzhydryl methacrylate, benzhydryl acrylate, N-benzyl methacrylate, N-benzyl acrylate, N,N-diphenyl methacrylamide, N,N-diphenyl acrylamide, naphthyl methacrylate, naphthyl acrylate, phenyl methacrylate and phenyl acrylate.

In some examples, the latex polymer comprises at least about 1 wt % aromatic monomers by total weight solids of the latex polymer, for example at least about 2 wt %, or at least about 5 wt % aromatic monomers by total weight solids of the latex polymer.

In some examples, the latex polymer comprises up to about 35 wt % aromatic monomers by total weight solids of the latex polymer, for example up to about 30 wt %, up to about 25 wt %, or up to about 20 wt % aromatic monomers by total weight solids of the latex polymer.

In some examples, the latex polymer comprises from about 1 wt % to about 35 wt % aromatic monomers by total weight solids of the latex polymer, for example from about 2 wt % to about 30 wt %, or about 5 wt % to about 25 wt % aromatic monomers by total weight solids of the latex polymer.

In some examples, the composition from which the latex polymer is derived further comprises an alkyl meth(acrylate). In some examples, the composition from which the latex polymer is derived comprises an alkyl methacrylate monomer. In some examples, the composition from which the latex polymer is derived comprises an alkyl acrylate monomer. In some examples, the composition from which the latex polymer is derived comprises an alkyl acrylate monomer and an alkyl methacrylate monomer. In some examples, the alkyl (meth)acrylate may be a $C_{1-8}$ alkyl (meth)acrylate.

In some examples, the latex polymer comprises an alkyl meth(acrylate) component. In some examples, the latex polymer further comprises an alkyl methacrylate component. In some examples, the latex polymer further comprises an alkyl acrylate component. In some examples, the latex polymer further comprises an alkyl acrylate component and an alkyl methacrylate component.

In some examples, the latex polymer comprises from about 0 wt % to about 10 wt %, for example from about 0.1 wt % to about 10 wt % of an alkyl meth(acrylate), for example methyl methacrylate.

In some examples, the latex polymer comprises a copolymer formed from an alkyl meth(acrylate) monomer, a cycloaliphatic monomer and an aromatic monomer. In some examples, the latex polymer comprises a copolymer formed from an alkyl meth(acrylate) monomer, (meth)acrylic acid, a cycloaliphatic monomer and an aromatic monomer. In some examples, the latex polymer comprises a copolymer formed from a (meth)acrylic acid, a cycloaliphatic monomer and an aromatic monomer.

In some examples, the composition from which the latex polymer is derived further comprises an acid monomer, for example (meth)acrylic acid monomers or carboxylic acid monomers. In some examples, the composition from which the latex polymer is derived further comprises (meth)acrylic acid. For example, the composition may comprise (meth) acrylic acid in an amount of 0 wt % to about 15 wt %, about 0.1 wt % to about 15 wt %, for example, about 0.25 wt % to about 10 wt %, or about 0.25 wt % to about 6 wt %.

In some examples, the composition from which the latex polymer is derived further comprises methacrylic acid. For example, the composition may comprise methacrylic acid in an amount of 0 wt % to about 15 wt %, about 0.1 wt % to about 15 wt %, for example, about 0.25 wt % to about 10 wt %, or about 0.25 wt % to about 6 wt %.

In some examples, the composition from which the latex polymer is derived further comprises an alkyl meth(acrylate) monomer and/or (meth)acrylic acid. In some examples, the composition from which the latex polymer is derived further comprises an alkyl meth(acrylate) monomer and (meth) acrylic acid.

In some examples, the latex polymer substantially lacks a styrene component. For example, the latex polymer may comprise less than about 5 wt % styrene by total weight solids of the latex polymer, for example less than about 4 wt %, less than about 3 wt %, less than about 2 wt %, less than about 1 wt %, less than about 0.5 wt %, or less than about 0.1 wt % styrene by total weight solids of the latex polymer. In some examples, the latex polymer lacks a styrene component.

In some examples, the latex polymer may be prepared by copolymerizing the monomer components with a copolymerizable surfactant (for example surfactants from the Hitenol® AR series or Hitenol® BC series, e.g. Hitenol® BC-10, BC-30, KH-05 or KH-10) to form a latex dispersion.

In some examples, the latex polymer is prepared by combining the monomers as an aqueous emulsion with an initiator. In some examples any suitable polymer initiator may be used. In some examples, the initiator may be selected from a persulfate, such as a metal persulfate or an ammonium persulfate. In some examples, the initiator may be selected from a sodium persulfate, ammonium persulfate or potassium persulfate.

In some examples, the latex polymer has a glass transition temperature of about 20° C. or greater, for example about 30° C. or greater, about 40° C. or greater, about 45° C. or greater, or about 50° C. or greater.

In some examples, the latex polymer has a glass transition temperature of up to about 100° C., for example up to about 95° C., up to about 90° C., up to about 80° C., or up to about 70° C.

In some examples, the latex polymer has a glass transition temperature in the range of about 20° C. to about 100° C., for example about 30° C. to about 90° C., about 50° C. to about 90° C., or about 55° C. to about 70° C.

The glass transition temperature (Tg) of the latex polymer may be estimated using the Fox equation (T. G. Fox, Bull. Am. Physics Soc., Volume 1, Issue No. 3, page 123 (1956)) using the Tg of the homopolymers of each of the monomers forming the copolymer of the latex polymer. The maximum Tg of each of the homopolymers of each of the monomers making up to copolymer of the latex polymer may be taken from literature values (for example as listed in "Polymer Handbook", edited by J. Brandrup, E. H. Immergut, and E. A. Grulke, Wiley Publishers, $4^{th}$ edition). The glass transition temperature of the latex polymer may also be determined using DSC (differential scanning calorimetry) according to ASTM D3418.

In some examples, the inkjet ink composition comprises up to about 35 wt % pigment and latex polymer solids by total weight of the composition, for example up to about 30 wt %, about 25 wt % or up to about 20 wt % pigment and latex polymer solids by total weight of the composition.

In some examples, the inkjet ink composition comprises from about 0.5 wt % to about 35 wt % pigment and latex polymer solids by total weight of the composition, for example from about 1 wt % to about 30 wt %, from about 1 wt % to about 25 wt %, or from about 2 wt % to about 20 wt % pigment and latex polymer solids by total weight of the composition. The present inventors have found that compositions having a total amount of pigment and latex polymer solids within these ranges may be suitable for inkjet printing, for example for thermal inkjet printing.

In some examples, the inkjet ink composition comprises at least about 3 wt % latex polymer by total weight of the composition, for example at least about 5 wt % latex polymer by total weight of the composition. In some examples, the inkjet ink composition comprises up to about 25 wt % latex polymer by total weight of the composition, for example up to about 20 wt %, or up to about 15 wt % latex polymer by total weight of the composition. In some examples, the inkjet ink composition comprises from about 3 wt % to about 25 wt %, for example about 5 wt % to about 25 wt % latex polymer by total weight of the composition.

Pigment

In some examples, the inkjet ink composition comprises a pigment. For example, the inkjet ink composition may comprise a latex polymer, a pigment, and an ink vehicle.

In some examples, the inkjet ink composition is unpigmented or substantially lacks a pigment. For example, the inkjet ink composition may comprise less than 0.5 wt % of a pigment, for example less than 0.1 wt % of a pigment or less than 0.05 wt % of a pigment by total weight of the composition. In some examples, the inkjet ink composition is unpigmented and lacks a pigment, for example the inkjet ink composition may be a colourless composition.

The term "pigment" can include particulate dispersible colorants that can be suspended or dispersed in a liquid vehicle in accordance with embodiments of the present invention. The pigment itself can be a self-dispersed pigment or a non-self-dispersed pigment.

The pigment may include black pigments, white pigments, cyan pigments, magenta pigments, yellow pigments, or the like. Suitable inorganic pigments include, for example, carbon black. However, other inorganic pigments may be suitable such as titanium oxide, cobalt blue (CoO—$Al_2O_3$), chrome yellow ($PbCrO_4$), and iron oxide. Suitable organic pigments include, for example, azo pigments including diazo pigments and monoazo pigments, polycyclic pigments (e.g., phthalocyanine pigments such as phthalocyanine blues and phthalocyanine greens, perylene pigments, perinone pigments, anthraquinone pigments, quinacridone pigments, dioxazine pigments, thioindigo pigments, isoindolinone pigments, pyranthrone pigments, and quinophthalone pigments), insoluble dye chelates (e.g., basic dye type chelates and acidic dye type chelate), nitropigments, nitroso pigments, and the like. Representative examples of phthalocyanine blues include copper phthalocyanine blue and derivatives thereof (Pigment Blue 15). Representative examples of quinacridones include Pigment Orange 48, Pigment Orange 49, Pigment Red 122, Pigment Red 192, Pigment Red 202, Pigment Red 206, Pigment Red 207, Pigment Red 209, Pigment Violet 19 and Pigment Violet 42. Representative examples of anthraquinones include Pigment Red 43, Pigment Red 194 (Perinone Red), Pigment Red 216 (Brominated Pyranthrone Red) and Pigment Red 226 (Pyranthrone Red). Representative examples of perylenes include Pigment Red 123 (Vermillion), Pigment Red 149 (Scarlet), Pigment Red 179 (Maroon), Pigment Red 190 (Red), Pigment Violet 19, Pigment Red 189 (Yellow Shade Red) and Pigment Red 224. Representative examples of thioindigoids include Pigment Red 86, Pigment Red 87, Pigment Red 88, Pigment Red 181, Pigment Red 198, Pigment Violet 36, and Pigment Violet 38. Representative examples of heterocyclic yellows include Pigment Yellow 1, Pigment Yellow 3, Pigment Yellow 12, Pigment Yellow 13, Pigment Yellow 14, Pigment Yellow 17, Pigment Yellow 65, Pigment Yellow 73, Pigment Yellow 74, Pigment Yellow 151, Pigment Yellow 117, Pigment Yellow 128 and Pigment Yellow 138, Pigment Yellow 155, Pigment Yellow 83, and Pigment Yellow 213. Such pigments are commercially available in either powder or press cake form from a number of sources including, BASF™ Corporation, Engelhard™ Corporation and Sun Chemical™ Corporation.

Examples of black pigments that can be used include carbon pigments. The carbon pigment can be almost any commercially available carbon pigment that provides acceptable optical density and print characteristics. Carbon pigments suitable for use in the present system and method include, without limitation, carbon black, graphite, vitreous carbon, charcoal, and combinations thereof. Such carbon pigments can be manufactured by a variety of known methods such as a channel method, a contact method, a furnace method, an acetylene method, or a thermal method, and are commercially available from such vendors as Cabot™ Corporation, Columbian Chemicals Company, Degussa AG™, and E.I. DuPont™ de Nemours and Company. Suitable carbon black pigments include, without limitation, Cabot pigments such as MONARCH™ 1400, MONARCH™ 1300, MONARCH™ 1100, MONARCH™ 1000, MONARCH™ 900, MONARCH™ 880, MONARCH™ 800, MONARCH™ 700, CAB-O-JET™ 200, CAB-O-JET™ 300, REGAL™, BLACK PEARLS, ELFTEX™, MOGUL™, and VULCAN™ pigments; Columbian pigments such as RAVEN™ 7000, RAVEN™ 5750, RAVEN™ 5250, RAVEN™ 5000, and RAVEN™ 3500; Degussa pigments such as Color Black FW 200, RAVEN™ FW 2, RAVEN™ FW 2V, RAVEN™ FW 1, RAVEN™ FW 18, RAVEN™ S160, RAVEN™ FW S170, Special Black™ 6, Special Black™ 5, Special Black™ 4A, Special Black™ 4, PRINTEX™ U, PRINTEX™ 140U, PRINTEX™ V, and PRINTEX™ 140V.

Similarly, a wide variety of colored pigments can be used with the inkjet ink composition, therefore the following listing is not intended to be limiting. For example, colored pigments can be blue, brown, cyan, green, white, violet, magenta, red, orange, yellow, as well as mixtures thereof. The following color dispersions are available from Cabot™ Corp. CABO-JET™ 250C, CABO-JET™ 260M, and CABO-JET™ 270Y. The following color pigments are available from BASF™ Corp.: PALIOGEN™ Orange, PALIOGEN™ Orange 3040, PALIOGEN™ Blue L 6470, PALIOGEN™ Violet 5100, PALIOGEN™ Violet 5890, PALIOGEN™ Yellow 1520, PALIOGEN™ Yellow 1560, PALIOGEN™ Red 3871K, PALIOGEN™ Red 3340, HELIOGEN™ Blue L 6901F, HELIOGEN™ Blue NBD 7010, HELIOGEN™ Blue K 7090, HELIOGEN™ Blue L 7101F, HELIOGEN™ Blue L6900, L7020, HELIOGEN™ Blue D6840, HELIOGEN™ Blue D7080, HELIOGEN™ Green L8730, HELIOGEN™ Green K 8683, and HELIOGEN™ Green L 9140. The following pigments are available from Ciba-Geigy Corp.: CHROMOPHTAL™ Yellow 3G, CHROMOPHTAL™ Yellow GR, CHROMOPHTAL™ Yellow 8G, IGRAZIN™ Yellow SGT, IGRALITE™ Rubine 4BL, IGRALITE™ Blue BCA, MONASTRAL™ Magenta, MONASTRAL™ Scarlet, MONASTRAL™ Violet R, MONASTRAL™ Red B, and MONASTRAL™ Violet Maroon B. The following pigments are available from Heubach Group™: DALAMAR™ Yellow YT-858-D and HEUCOPHTHAL™ Blue G XBT-583D. The following pigments are available from Hoechst Specialty Chemicals™ Permanent Yellow GR, Permanent Yellow G, Permanent Yellow DHG, Permanent Yellow NCG-71, Permanent Yellow GG, Hansa Yellow RA, Hansa Brilliant Yellow 5GX-02, Hansa Yellow-X, NOVOPERM™ Yellow HR, NOVOPERM™ Yellow FGL, Hansa Brilliant Yellow 10GX, Permanent Yellow G3R-01, HOSTAPERM™ Yellow H4G, HOSTAPERM™ Yellow H3G, HOSTAPERM™ Orange GR, HOSTAPERM™ Scarlet GO, HOSTAPERM™ Pink E, Permanent Rubine F6B, and the HOSTAFINE™ series. The following pigments are available from Mobay Corp.: QUINDO™ Magenta, INDOFAST™ Brilliant Scarlet, QUINDO™ Red R6700, QUINDO™ Red R6713, and INDOFAST™ Violet. The following pigments are available from Sun Chemical Corp.: L74-1357 Yellow, L75-1331 Yellow, and L75-2577 Yellow. Other examples of pigments can include Normandy Magenta RD-2400, Permanent Violet VT2645, Argyle Green XP-111-S, Brilliant Green Toner GR 0991, Sudan Blue OS, PV Fast Blue B2GO1, Sudan III, Sudan II, Sudan IV, Sudan Orange G, Sudan Orange 220, Ortho Orange OR 2673, Lithol Fast Yellow 0991 K, Paliotol Yellow 1840, Lumogen Yellow D0790, Suco-Gelb L1250, Suco-Yellow D1355, Fanal Pink D4830, Cinquasia Magenta, Lithol Scarlet D3700, Toluidine Red, Scarlet for Thermoplast NSD PS PA, E. D. Toluidine Red, Lithol Rubine Toner, Lithol Scarlet 4440, Bon Red C, Royal Brilliant Red RD-8192, Oracet Pink RF, Lithol Fast Scarlet L4300, and white TIPURE R-101. These pigments are available from commercial sources such as Hoechst Celanese Corporation™, Paul Uhlich, BASF, American Hoechst™, Ciba-Geigy™, Aldrich™, DuPont™, Ugine Kuhlman of Canada™, Dominion Color Company™, Magruder™, and Matheson™. Examples of other suitable colored pigments are described in the Colour Index, 3rd edition (The Society of Dyers and Colourists, 1982).

In some examples, the inkjet ink composition comprises at least about 0,1 wt % pigment by total weight of the composition, for example, at least about 0.3 wt % pigment by total weight of the composition. In some examples, the inkjet ink composition comprises up to about 30 wt % pigment by total weight of the composition, for example, up to about 20 wt % pigment by total weight of the composition, or up to about 15 wt % pigment by total weight of the composition. In some examples, the inkjet ink composition comprises from about 0.1 wt % to about 30 wt %, for example 0.3 wt % to about 30 wt % pigment by total weight of the composition.

In some examples, the inkjet ink composition comprises an amount of pigment and an amount of latex polymer, such that the ratio of the amount of pigment to amount of latex by weight is in the range of about 0.1:15 to 10:5.

Ink Vehicle

The ink vehicle of the inkjet ink composition comprises water. The water, or a portion of the water, of the ink vehicle may be introduced to the ink vehicle as a latex polymer emulsion is combined with the co-solvent of the ink vehicle. In some examples, additional water may be added to the inkjet ink composition.

The inkjet ink composition comprises water. In some examples, the inkjet ink composition comprises at least about 20 wt %, for example at least about 30 wt %, at least about 40 wt %, or at least about 50 wt % by total weight of the composition. In some examples, the inkjet ink composition comprises up to about 90 wt % water, for example up to about 85 wt %, up to about 80 wt %, or up to about 75 wt % by total weight of the composition. In some examples, the inkjet ink composition comprises water in an amount from about 20 wt % to about 85 wt % by total weight of the inkjet ink composition, for example about 30 wt % to about 80 wt %, about 40 wt % to about 80 wt %, or from about 50% to about 75% water.

Co-Solvent

The ink vehicle comprises water and a co-solvent (for example a blend of co-solvents). In some examples, the inkjet ink composition comprises the co-solvent in an amount of at least about 1 wt %, for example at least about 5 wt %, or at least about 10 wt % by total weight of the composition. In some examples, the inkjet ink composition comprises the co-solvent in an amount up to about 50 wt %, for example up to about 40 wt %, or up to about 35 wt % by total weight of the composition. In some examples the inkjet ink composition comprises a co-solvent in an amount of about 1 to about 50 wt % by total weight of the composition, for example from about 5 to about 40 wt % of the composition, or about 10 to about 35 wt % of the total weight of the composition.

In some examples, the co-solvent comprises a solvent having a boiling point in the range of about 170° C. to about 215° C.; and a solvent having a boiling point of about 220° C. or more. The solvent having a boiling point in the range of about 170° C. to about 215° C. may be a blend of solvents each solvent of the blend of solvents having a boiling point in the range of about 170° C. to about 215° C. The solvent having a boiling point of about 220° C. or more may be a blend of solvents each solvent of the blend of solvents having a boiling point of about 220° C. or more.

In some examples, the inkjet ink composition comprises about 10 wt % to about 40 wt % by total weight of the composition of the solvent having a boiling point in the range of about 170° C. to about 215° C. and about 0.1 wt % to about 8 wt % by total weight of the composition of the solvent having a boiling point of about 220° C. or more.

In some examples, the inkjet ink composition comprises: 10 wt % to about 40 wt % by total weight of the composition of a solvent having a boiling point in the range of about 170° C. to about 215° C. and about 0.5 wt % to about 8 wt % of a solvent having a boiling point in the range of about 220° C. to about 285° C.; and/or about 0.1 wt % to about 4 wt % of a solvent having a boiling point of greater than about 285° C. and/or being insoluble in water. For example, the co-solvent may comprise solvent having a boiling point in the range of about 170° C. to about 215° C. and a second solvent having a boiling point in the range of about 220° C. to about 285° C. For example, the co-solvent may comprise a first solvent having a boiling point in the range of about 170° C. to about 215° C. and a third solvent having a boiling point of greater than about 285° C. and/or being insoluble in water. In some examples, the co-solvent comprises a first solvent having a boiling point in the range of about 170° C. to about 215° C. and a second solvent having a boiling point in the range of about 220° C. to about 285° C.; and a third solvent having a boiling point of greater than about 285° C. and/or being insoluble in water.

A solvent (or blend of solvents) having a boiling point in the range of about 170° C. to about 215° C. may be referred to herein as a first solvent.

A solvent (or blend of solvents) having a boiling point in the range of about 220° C. to about 285° C. may be referred to herein as a second solvent.

A solvent (or blend of solvents) having a boiling point of greater than about 285° C. and/or having a solubility below 5% in water may be referred to herein as a third solvent.

First Solvent—Solvent Having a Boiling Point of About 215° C. or Less

The ink vehicle of the inkjet ink composition comprises a solvent having a boiling point of about 215° C. or less (this solvent is referred to herein as the first solvent). In some examples, the first solvent has a boiling point of at least about 170° C., for example at least about 175° C., at least about 180° C., or at least about 185° C. In some examples, the first solvent has a boiling point in the range of about 170° C. to about 215° C. In some examples, the first solvent has a boiling point in the range of about 180° C. to about 215° C., for example about 185° C. to about 215° C.

In some examples, the first solvent is selected from an aliphatic alcohol, for example a primary aliphatic alcohol, a secondary aliphatic alcohol or a tertiary aliphatic alcohol. The aliphatic alcohol may be a diol. In some examples, the first solvent is an aliphatic alcohol containing 10 carbons or less, for example 8 carbons or less or 6 carbons or less. In some examples, the first solvent is an aliphatic alcohol being a diol containing 10 carbons or less, for example 8 carbons or less or 6 carbons or less.

In some examples, the first solvent is selected from the group comprising 1,2-propanediol, 1,2-butanediol, ethylene glycol, 2-methyl-2,4-pentanediol, 1,3-butanediol, 2-methyl-1,3-propanediol and 1,3-propanediol. In some examples the first solvent is selected from the group comprising 1,2-propanediol, 1,2-butanediol, ethylene glycol, 2-methyl-2,4-pentanediol, and 1,3-butanediol. In some examples the first solvent is selected from the group consisting of 1,2-propanediol, 1,2-butanediol, ethylene glycol, 2-methyl-2,4-pentanediol, 1,3-butanediol, 2-methyl-1,3-propanediol and 1,3-propanediol. In some examples the first solvent is selected from the group consisting of 1,2-propanediol, 1,2-butanediol, ethylene glycol, 2-methyl-2,4-pentanediol, and 1,3-butanediol. In some examples the first solvent is 1,2-butanediol.

The boiling points of 1,2-propanediol, 1,2-butanediol, ethylene glycol, 2-methyl-2,4-pentanediol, 1,3-butanediol, 2-methyl-1,3-propanediol and 1,3-propanediol are listed in table 1 below.

TABLE 1

| First solvent | Boiling point (° C.) |
|---|---|
| propylene glycol (1,2-propanediol) | 188 |
| 1,2-butanediol | 194 |
| ethylene glycol | 196 |
| 2-methyl-2,4-pentanediol (hexylene glycol) | 198 |
| 1,3-butanediol | 203 |
| 2-methyl-1,3-propanediol (MPdiol) | 213 |
| 1,3-propanediol | 214 |

In some examples, the inkjet ink composition comprises at least about 5 wt % of the first solvent by total weight of the composition.

In some examples, the inkjet ink composition comprises up to about 35 wt % of the first solvent by total weight of the composition, for example up to about 30 wt %, or up to about 20 wt % by total weight of the composition.

In some examples, the inkjet ink composition comprises the first solvent (e.g. a blend of first solvents) in an amount of from about 5 wt % to about 35 wt % by total weight of the composition, for example from about 10 wt % to about 30 wt %, about 10 wt % to about 20 wt %, or from about 15 wt % to about 20 wt % by total weight of the composition.

Solvent Having a Boiling Point of About 220° C. or More

The ink vehicle of the inkjet ink composition comprises a solvent having a boiling point of at least about 220° C., for example at least about 225° C. In some examples, the ink composition comprises from 0 wt % to about 8 wt % by total weight of the composition of the solvent having a boiling point of about 220° C. or more. In some examples, the ink composition comprises about 0.1 wt % to about 8 wt % by total weight of the composition of the solvent having a boiling point of about 220° C. or more.

The solvent having a boiling point of about 220° C. or more may comprise: a solvent having a boiling point in the range of about 220° C. to about 285° C.; and/or a solvent having a boiling point of greater than about 285° C. and/or being insoluble in water.

Second Solvent—Solvent Having a Boiling Point in the Range of About 220° C. to About 285° C.

The ink vehicle of the inkjet ink composition may comprise a second solvent (for example a blend of solvents) having a boiling point in the range of about 220° C. to about 285° C., for example about 225° C. to about 285° C.

In some examples the second solvent is selected from alcohols (including aliphatic alcohols and aromatic alcohols), esters, glycol ethers, di- and tri-alkylene glycols, amides, lactams and sulfones. In some examples the solvent is selected from aliphatic alcohols (including primary, secondary and tertiary aliphatic alcohols, including diols), aromatic alcohols, esters, alkylene glycol alkyl ethers (including di-, tri- and tetra-alkylene glycol alkyl ethers), glycol aryl ethers (such as alkylene glycol aryl ethers, including di- and tri-alkylene glycol aryl ethers), di- and tri-alkylene glycols, lactams (such as 2-pyrrolidinone) and sulfones (such as sulfolane).

In some examples, the second solvent is selected from aliphatic alcohols containing 20 carbons or less (for example aliphatic alcohols containing 10 carbons or less), esters containing 20 carbons or less (for example esters containing 12 carbons or less), glycol alkyl ethers, such as alkylene glycol alkyl ethers, containing 20 carbons or less (for example esters containing 12 carbons or less, or 10 carbons or less), glycol aryl ethers, such as alkylene glycol aryl ethers, containing 20 carbons or less (for example esters containing 12 carbons or less, or 10 carbons or less) such as glycol phenyl ethers (e.g. alkylene glycol phenyl ethers) containing 20 carbons or less, lactams and cyclic sulfones.

In some examples the second solvent is selected from the group comprising ethylene glycol 2-ethylhexyl ether, dipropylene glycol n-butyl ether, diethylene glycol n-butyl ether, propylene glycol phenyl ether, 2-pyrrolidinone, tripropylene glycol methyl ether, 2,2,4-trimethyl-1,3-pentanediol monoisobutyrate, triethyl citrate, tripropylene glycol n-propyl ether, tripropylene glycol n-butyl ether, tetraethylene glycol dimethyl ether, and dipropylene glycol phenyl ether. In some examples, the second solvent is selected from the group comprising 2-pyrrolidinone, tripropylene glycol methyl ether and tripropylene glycol n-butyl ether.

The boiling points of examples of second solvents are listed in table 2 below.

TABLE 2

| Second solvent | Boiling point (° C.) |
|---|---|
| ethylene glycol 2-ethylhexyl ether (Eastman EEH) | 229 |
| dipropylene glycol n-butyl ether (Dowanol ™ DPnB) | 230 |
| diethylene glycol n-butyl ether (Butyl Carbitol) | 230 |
| propylene glycol phenyl ether (Dowano ™l PPh) | 243 |
| 2-pyrrolidinone | 245 |
| tripropylene glycol methyl ether (Dowanol ™ TPM) | 245 |
| 2,2,4-trimethyl-1,3-pentanediol monoisobutyrate (Texanol ™) | 254 |
| triethyl citrate | 261 |
| tripropylene glycol n-propyl ether | 261 |
| tripropylene glycol n-butyl ether (Dowanol ™ TPnB) | 274 |
| tetraethylene glycol dimethyl ether (tetraglyme) | 275 |
| dipropylene glycol phenyl ether (Dowanol ™ DiPPh) | 280 |

In some examples, the inkjet ink composition comprises at least about 0.1 wt % of the second solvent by total weight of the composition, for example at least about 0.5 wt %, at least about 1 wt %, at least about 1.5 wt %, or about 2 wt % by total weight of the composition.

In some examples, the inkjet ink composition comprises up to about 8 wt % of the second solvent by total weight of the composition, for example up to about 5 wt %, up to about 3 wt %, or about 2 wt % by total weight of the composition.

In some examples, the inkjet ink composition comprises the second solvent (e.g. a blend of second solvents) in an amount of from about 0 wt % to about 8 wt % by total weight of the composition, for example from about 0.1 wt % to about 8 wt %, about 0.5 wt % to about 8 wt %, from about 0.5 wt % to about 5 wt %, or from about 0.5 wt % to about 4 wt % by total weight of the composition.

Third Solvent—A Solvent (or Solvent Blend) Having a Boiling Point of Greater Than About 285° C. and/or Being Insoluble in Water.

In some examples, the ink vehicle comprises a third solvent. In some examples, the ink vehicle comprises a first solvent and a third solvent. In some examples, the ink vehicle comprises a first solvent, a second solvent and a third solvent, The third solvent (e.g. a blend of third solvents) may be present in the inkjet ink composition in an amount of at least about 0.05 wt % by total weight of the composition, for example at least about 0.1 wt %, or at least about 0.2 wt % by total weight of the composition. In some examples the third solvent is present in the inkjet ink composition in an amount up to about 4 wt %, for example up to about 2 wt % or up to about 1 wt %. In some examples the third solvent is present in the inkjet ink composition in an amount from 0 wt % to about 4 wt %, for example about 0.1 wt % to about 4 wt %, about 0.1 wt % to about 2 wt %, or about 0.2 wt % to about 1 wt %.

In some examples, the third solvent is a component which remains in an ink layer printed on a print substrate after the inkjet ink composition has been cured such that at least a portion of the water and the first solvent, and optionally the second solvent have been removed.

In some examples, the third solvent has a boiling point of greater than about 285° C.

In some examples, the third solvent is a water soluble third solvent, for example a water soluble solvent having a boiling point of greater than about 285° C. In some examples a water soluble third solvent is a third solvent having a water solubility of greater than about 5% in water, for example greater than about 10%, greater than about 25%, greater than about 50%, greater than about 75%, greater than about 80%, or greater than about 90% in water. In some examples, when the third solvent is a water soluble third solvent the third solvent is present in the ink composition in an amount between 0.1 wt % and 4 wt % by total weight of the ink composition, for example between 0.2 wt % and 4 wt % by total weight of the ink composition.

The term "insoluble" used herein is used to refer to a solvent having a water solubility of less than about 10%, for example less than about 5%, less than about 4.5%, or less than about 4%. Solubility of the third solvent in water may be determined as the amount of solvent by weight which may be dissolved in 100 g of water (under conditions of standard temperature and pressure) to produce a saturated solution. Alternatively the solubility of the third solvent may be determined by referring to data provided by the manufacturer.

In some examples, when the third solvent is a water insoluble third solvent the third solvent is present in the ink composition in an amount between 0.1 wt % and 1 wt % by total weight of the ink composition, for example between 0.2 wt % and 1 wt % by total weight of the ink composition.

In some examples, the third solvent may be insoluble in water (for example have a water solubility of less than about 10%) and have a boiling point of greater than about 285° C.

In some examples, the third solvent is selected from the group comprising esters (such as citrates, e.g. triethyl citrate, and 2,2,4-trimethyl-1,3-pentanedial monoisobutyrate), glycol esters, glycol ether-esters, glycol ethers, lactams and phosphate ethers. In some examples, the third solvent may be selected from the group comprising esters containing 30 carbons or less; glycol esters, such as alkylene glycol esters, optionally containing 30 carbons or less; glycol ether-esters (such as triethylene glycol n-pentyl ether benzoate; triethylene glycol n-hexyl ether benzoate; tripropylene glycol n-butyl ether benzoate; tripropylene glycol n-pentyl ether benzoate; dipropylene glycol n-butyl ether benzoate; dipropylene glycol 2-ethylhexyl ether benzoate; dipropylene glycol phenyl ether benzoate; ethylene glycol n-hexyl ether levulinate; diethylene glycol n-hexyl ether levulinate; diethylene glycol phenyl ether levulinate; triethylene glycol n-butyl ether levulinate; dipropylene glycol phenyl ether levulinate; tripropylene glycol methyl ether levulinate; tripropylene glycol n-propyl ether levulinate; and tripropylene glycol n-butyl ether levulinat); glycol ethers, such as glycol aryl ethers (e.g. alkylene glycol aryl ethers) such glycol phenyl ethers (e.g. alkylene glycol phenyl ethers) optionally containing 30 carbons or less, and glycol alkyl ethers (e.g. alkylene glycol alkyl ethers) optionally containing 30 carbons or less lactams and phosphate ethers.

In some examples, the third solvent is selected from the group comprising: Benzoflex™ 2088, Benzoflex™ 50, Benzoflex™ LA-795, dibutyl sebacate, Dowanol™ DiPPh, Eastman™ 168 (bis(2-ethylhexyl) terephthalate), Eastman™ EEH (ethylene glycol 2-ethylhexyl ether), Eastman™ TXIB Formulation Additive (2,2,4-trimethyl-1,3-pentanedial diisobutyrate), Hexamoll™ DINCH™ (1,2-Cyclohexane dicarboxylic acid diisononyl ester), Loxanol CA 5310 (propylene glycol mono oleate), Loxanol™ CA 5320 (propylene glycol monoester of C-18 fatty acids), Optifilm™ 300 (2,2,4-trimethyl-1,3-pentanedial diisobutyrate), Optifilm™ 400 (triethylene glycol bis(2-ethylhexanoate), Texanol™ (2,2,4-trimethyl-1,3-pentanediol monoisobutyrate), triethyl citrate, triethylene glycol bis(2-ethylhexanoate), tris(2-butoxyethyl)phosphate, UCAR Filmer IBT (2,2,4-trimethyl-1,3-pentanediol monoisobutyrate), Velate™ 368 (2-ethylhexylbenzoate), N-(2-hydroxyethyl)-2-pyrollidinone, triethylene glycol n-pentyl ether benzoate, triethylene glycol n-hexyl ether benzoate, tripropylene glycol n-butyl ether benzoate, tripropylene glycol n-pentyl ether benzoate, dipropylene glycol n-butyl ether benzoate, dipropylene glycol 2-ethylhexyl ether benzoate, dipropylene glycol phenyl ether benzoate, ethylene glycol n-hexyl ether levulinate, diethylene glycol n-hexyl ether levulinate, diethylene glycol phenyl ether levulinate, triethylene glycol n-butyl ether levulinate, dipropylene glycol phenyl ether levulinate, tripropylene glycol methyl ether levulinate, tripropylene glycol n-propyl ether levulinate, and tripropylene glycol n-butyl ether levulinate.

Other Additives

The ink vehicle may also comprise a variety of additional components, suitable for inkjet ink compositions, selected from surfactants (for example suitable surfactants may be selected form alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amides, dimethicone copolyols, fluoroalkyl polyethylene oxides, substituted amine oxides, and the like, surfactants when present may be present in an amount from 0.01 wt % to 10 wt %), buffers, biocides (such as Nuosept™ (Nudex™ Inc.), Ucarcide™ (Union carbide Corp™.), Vancide™ (R.T. Vanderbilt™ Co.), Proxel™ (Lonza™), and combinations thereof), viscosity modifiers, sequestering agents (such as EDTA (ethylene diamine tetraacetic acid)), stabilizing agents, wetting agents, and humectants. In some examples, these other additives may be present in a total amount of from 0 wt % to 20 wt %, Inkjet Cartridge Described herein is an inkjet cartridge comprising an inkjet ink composition as described herein and an ink ejection device. In some examples, the ink ejection device comprises a recirculation system.

In some examples, the ink ejection device is a thermal ink ejection device. In some examples, the ink ejection device is a piezo ink ejection device.

In some examples, the inkjet ink cartridge comprises:
an inkjet ink composition comprising a latex polymer; and an ink vehicle comprising water and a co-solvent comprising a solvent having a boiling point in the range of about 170° C. to about 215° C. and a solvent having a boiling point of about 220° C. or more; and
an ink ejection device comprising a recirculation system.

The inkjet ink composition may be the inkjet ink composition described above.

In some examples, the inkjet cartridge comprises an ink ejection device from which the inkjet ink composition may be ejected. In some examples, the inkjet cartridge comprises an ink reservoir in which an inkjet ink composition may be contained.

In some examples, the ink ejection device comprises a recirculation system comprising at least one drop generator for generating ink drops from the inkjet ink composition and ejected ink drops from the inkjet cartridge. The at least one drop generator may be in fluid communication, for example via an ink slot, with an ink reservoir such that inkjet ink contained in the ink reservoir may be supplied to the at least one drop generator of the ink ejection device. The at least one drop generator may comprise a nozzle through which an inkjet ink composition is ejected from the cartridge as an ink drop. In some examples each drop generator includes a firing chamber and a firing element.

In some examples, the recirculation system comprises:
a drop generator;
a recirculation channel including an inlet channel, an outlet channel and a connection channel; and
an ink slot to supply the inkjet ink composition to the drop generator via the inlet channel and the outlet channel of the recirculation channel.

In some examples, the inkjet cartridge is a thermal inkjet cartridge. The ink ejection device of a thermal inkjet cartridge may eject ink drops from a nozzle by passing an electrical current through a heating element (as the firing element) to generate heat and vaporize a small portion of ink within the firing chamber.

In some examples, the inkjet cartridge is a piezo inkjet cartridge. The ink ejection device of a piezo inkjet cartridge may eject ink drops from a nozzle using a piezoelectric actuator as the firing element.

FIG. 1 shows an example of an inkjet cartridge 10 having an ink ejection device 12. In some examples, the inkjet cartridge 10 comprises a cartridge body 14 that contains inkjet ink composition supply. The inkjet ink composition supply can include an ink reservoir wholly contained within the cartridge body 14 or, alternatively, can include a chamber inside the cartridge body 14 that is fluidly coupled to one or more off-axis ink reservoirs (not shown). The ink ejection device 12 may be mounted on an outer surface of the cartridge body 14 in fluid communication with the inkjet ink composition supply. The ink ejection device 12 ejects drops of inkjet ink composition through a nozzle, or a plurality of nozzles 11 formed therein. The inkjet cartridge 10 may comprise electrical connectors 13 for transmitting signals to and from the ink ejection device 12. In some examples, the ink ejection device 12 is in communication with an electronic controller to control ink ejection from the ink ejection device and/or ink circulation within the fluid ejection device 12.

The inkjet cartridge 10 comprising the ink ejection device 12 may be mounted in a carriage of an inkjet printer. The carriage may move the inkjet cartridge across a print substrate. In some examples, the inkjet printer may be a thermal inkjet printer. A thermal inkjet cartridge 10 may operate by causing a small volume of ink to vaporize and be ejected from a firing chamber through one of a plurality of nozzles 11 so as to print a dot of ink on a print substrate. The nozzles 11 may be arranged in one or more linear nozzle arrays. The nozzles 11 may be aligned parallel to the direction in which the print substrate is moved through the printer and perpendicular to the direction of motion of the ink ejection device 12 with the inkjet cartridge 10. Control of the ejection of ink from each nozzle causes characters, or other images, to be printed in a swath across the print substrate.

Figure 2:
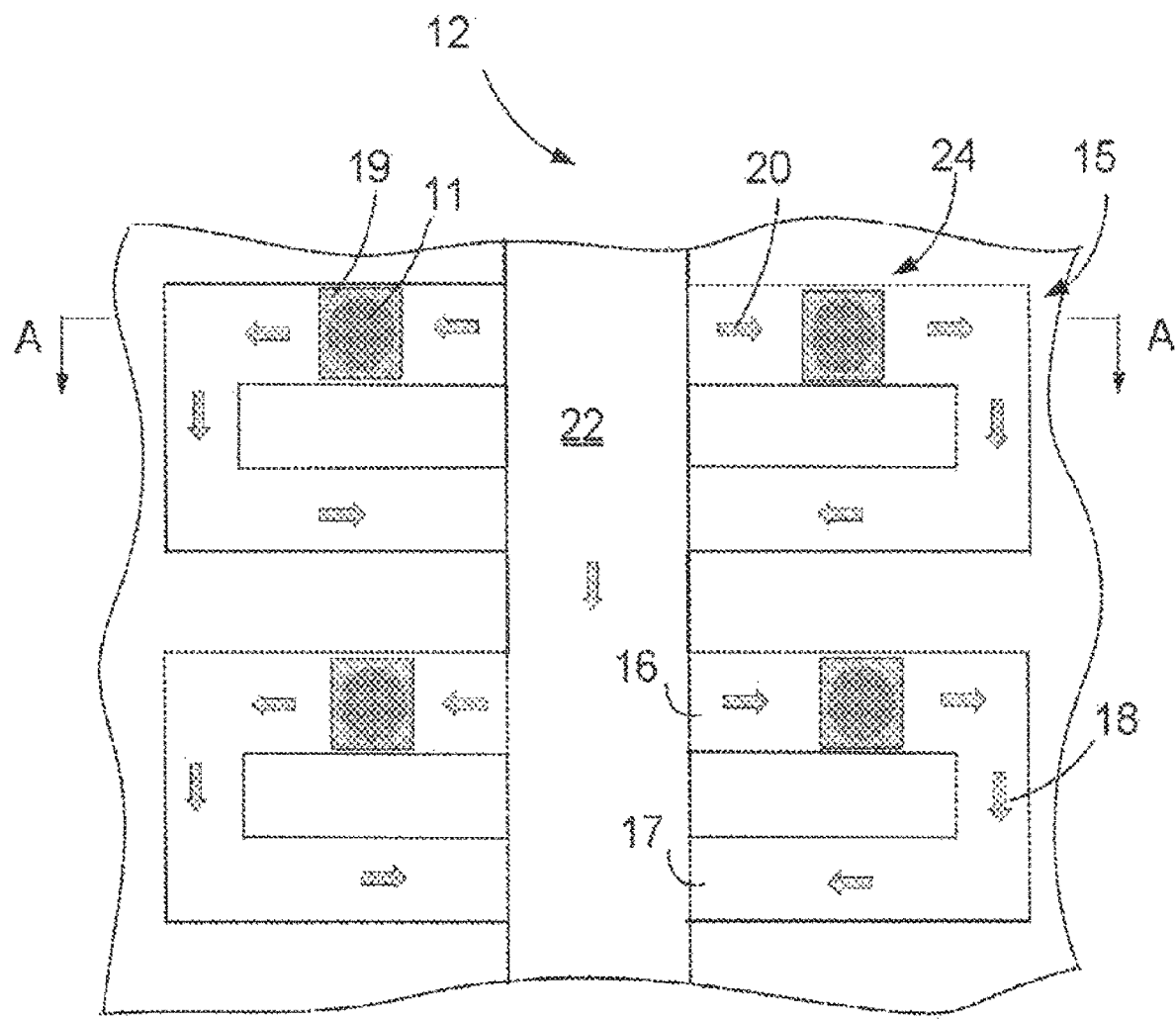
FIG. 2 is a top view of an example of a fluid ejection device containing a plurality of recirculation systems.

FIG. 2 shows an example of an ink ejection device 12 containing a plurality of recirculation systems 15 and a plurality of drop generators 24. In some examples, each recirculation system 15 contains at least a drop generator 24. In some examples, each drop generator 24 includes a firing element 19 and a firing chamber 26 (shown in FIG. 3). In some examples, each drop generator 24 includes a nozzle 11. In some examples, a recirculation system 15 comprises recirculation channels having an inlet channel 16, an outlet channel 17 and a connection channel 18. In some examples, the ink ejection device 12 contains a plurality of recirculation systems 15 each including recirculation channels having an inlet channel 16, an outlet channel 17 and a connection channel 18.

In some examples, the ink ejection device 12 comprises an ink slot 22 that communicates with drop generator 24 via the inlet channel 16 and the outlet channel 17 of the recirculation channel to supply the inkjet ink composition to the drop generator 24. In some examples, the recirculation system 15, containing inlet channel 16, outlet channel 17 and connection channel 18, has a U-shape and forms a short loop recirculation system. In some examples, the inkjet ink composition 20 enters the recirculation system via the inlet channel 16, goes to the drop generator 24, follows the flow via the connection channel 18 and goes back to the ink slot 22 via the outlet channel 17.

In some examples, the recirculation channel of the recirculation system 15 is asymmetrical with reference to the drop generator 24 (i.e. the drop generator 24 is asymmetrically positioned in the recirculation channel with respect to the to the centre point of the length of the recirculation channel). This positioning improves flow of ink through the recirculation channel.

Figure 3:
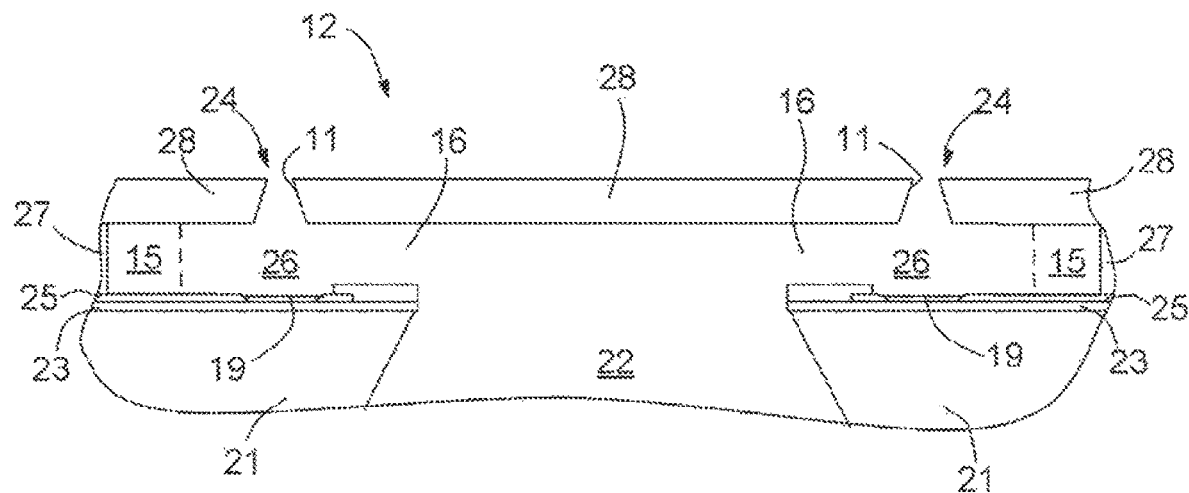
FIG. 3 is a cross-sectional side view of an example of a fluid ejection device taken along line A-A of FIG. 2.

FIG. 3 shows an example of a cross-sectional view of an example of an ink ejection device 12 taken along line A-A of FIG. 2. Referring to FIG. 3, the ink ejection device 12 may comprise a substrate 21 having at least one ink slot 22 formed therein with a plurality of drop generators 24 arranged around the ink slot 22. The ink slot 22 is an elongated slot in fluid communication with the inkjet ink composition supply. Each drop generator 24 may comprise a nozzle 11, a firing chamber 26, an inlet channel 16 and an outlet channel 17 establishing fluid communication between the ink slot 22 and the firing chamber 26, and a firing element 19 disposed in the firing chamber 26.

The inkjet ink composition can be fed to a drop generator 24 by either an inlet channel 16 or an outlet channel 17 depending on the direction of the inkjet ink composition flow along the recirculation system 15. The firing elements 19 can be any device, such as a resistor or piezoelectric actuator, capable of being operated to cause drops of fluid to be ejected through the corresponding nozzle 11. In some examples, the firing element 19 is a resistor. In some examples, an oxide layer 23 is formed on a front surface of the substrate 21, and a thin film stack 25 is applied on top of the oxide layer 23. The thin film stack 25 may include an oxide layer, a metal layer defining the firing elements 19 and conductive traces, and a passivation layer. A chamber layer 27 that defines the recirculation system 15 may be formed on top of the thin film stack 25. A top layer 28 that may define the nozzles 11 and the recirculation system 15 may be formed on top of the chamber layer 27.

Each nozzle 11 may constitute an outlet of a firing chamber 26 in which is located a firing element 19. In printing operation, a drop of inkjet ink composition 20 may be ejected from a nozzle 11 by activating the corresponding firing element 19. The firing chamber 26 may then be refilled with printing fluid, which flows from the ink slot 22 via the recirculation channels through the inlet channel 16 (or the outlet channel 17). For example, to print a single dot of ink in a thermal inkjet printer, in the instance where the firing elements 19 are resistors, an electrical current from an external power supply that is passed through a selected thin film resistor. The resistor is thus energized with a pulse of electric current that heated the resistor 19. The resulting heat from the resistor 19 superheats a thin layer of the adjacent printing fluid causing vaporization. Such vaporization creates a vapor bubble in the corresponding firing chamber 26 that quickly expands and forces a droplet of printing fluid to be ejected through the corresponding nozzle 11. When the heating element cools, the vapor bubble quickly collapses, drawing more printing fluid into the firing chamber 26 in preparation for ejecting another drop from the nozzle 11.

The expanding bubble, from firing element or resistor 19, also pushes inkjet ink composition backward in inlet channel 16 or outlet channel 17 toward the inkjet ink composition supply. Such bubbles create thus a shock wave that results in directional pulsed flows and that create inkjet ink composition circulation along the recirculation channels and along the recirculation system. Thus, the re-circulation of the inkjet ink composition may involve air bubbles contained in the inkjet ink composition and purging them from firing chambers 26.

In some examples, the collapsing bubble pulls the inkjet ink composition 20 through the outlet channel 17, and allows thus a partial refilling of the firing chamber 26. Firing chamber refill is completed by capillary action. In addition, such capillary action make the inkjet ink composition 20 moves from the ink slot 22 to the next inlet channel 16 of the recirculation system and then to the drop generator 24. Thus, in some examples, the fluid ejection device according to the present disclosure does not accumulate bubbles in the firing chamber and does not present disadvantages often associated with the presence of such air bubbles.

The present inventors have found that employing an ink ejection device comprising a recirculation system in combination with the inkjet ink composition described herein provides improvements in decap performance of the inkjet ink composition. Therefore, the inkjet cartridge described herein can be used to inkjet print to a wide range of non-porous substrates while also improving the decap performance of the inkjet ink composition.

Method of Printing

Described herein is a method of inkjet printing. For example, a method of printing an inkjet ink composition described herein. The method of printing may comprise inkjet printing an inkjet ink composition as described herein to a print substrate (e.g. a non-porous print substrate) to form an inkjet ink layer (also referred to herein as an ink layer) on the print substrate. The ink layer formed on the print substrate comprises the inkjet ink composition comprising the latex polymer and ink vehicle.

In some examples, the method of printing comprises curing the latex polymer, for example curing the latex polymer on the print substrate (e.g. non-porous print substrate). Curing of the latex polymer forms a film of latex on the surface of the print substrate. Curing the latex polymer to form a film of latex on the print substrate improves the durability of an image printed using the inkjet ink composition.

In order for the latex polymer to be cured, firstly water should be evaporated from the ink layer, then the co-solvent (for example, first solvent and second solvent (where present)) should be at least partially evaporated from the ink layer such that particles of latex polymer come into close contact. Once the particles of the latex polymer come into close contact (due to the at least partial evaporation of water and co-solvent) the particles of the latex polymer may coalesce by the intermingling of polymer chains between adjacent latex polymer particles to cure the latex polymer to from a latex polymer film. In order for the latex polymer to be cured the temperature must be above the minimum film formation temperature (MFFT) of the latex polymer. Pigment particles, where present, remain in the ink layer and are embedded within the latex polymer film on curing of the latex polymer.

Water is evaporated from the printed inkjet ink composition before the co-solvent (e.g. first and second solvent and/or third solvent) are at least partially removed (evaporated) from the printed inkjet ink composition as water has a higher volatility (e.g. lower boiling point) than the co-solvent.

In some examples, the co-solvent comprises a first solvent and a second solvent. In such examples, the first solvent is evaporated, or at least partially evaporated, before the second solvent, again due to the higher volatility of the first solvent compared to the second solvent. The second solvent remains in the ink layer after the water has been evaporated and the first solvent at least partially evaporated.

In some examples, the co-solvent comprises a first solvent and a third solvent. In such examples, the first solvent is evaporated, or at least partially evaporated, before the third solvent, again due to the higher volatility of the first solvent compared to the third solvent. The third solvent remains in the ink layer after the water has been evaporated and the first solvent at least partially evaporated.

The present inventors have found that a co-solvent comprising a solvent having a boiling point of less than about 215° C. (e.g., a first solvent) in the inkjet ink composition allows for fast drying of the inkjet ink composition to enable high throughput through a printing system. The present inventors have found that the presence of the second solvent and/or third solvent in the inkjet ink composition which remain in the ink layer after evaporation of the water and at least partial evaporation of the first solvent ensures that the MFFT of the latex polymer remains lowered during the curing of the latex polymer.

In some examples, curing the latex polymer comprises evaporating water from the ink layer. In some examples, curing the latex polymer comprises evaporating water and at least a portion of the co-solvent from the ink layer. Evaporation of water and at least a portion of the co-solvent allows latex polymer particles within the ink layer to coalesce into a film ("cure"). Evaporation may be facilitated in a printing system by providing heat and/or airflow. Heating may be either conductive, radiative, or convective. Airflow may comprise parallel or impinging airflow. In some examples, heating the ink layer to evaporate water, for example water and at least a portion of co-solvent comprises heating the ink layer such that the temperature of the print substrate is maintained below a temperature at which deformation (e.g. warping) of the print substrate occurs. For example, heating the ink layer such that the print substrate reaches a temperature of less than about 70° C., for example about 65° C. or less.

In some examples, curing the latex polymer comprises evaporating substantially all of the water from the ink layer, for example evaporating at least about 95 wt %, for example at least about 99 wt %, or at least about 99.5 wt % of the water comprised in the inkjet ink composition printed as the ink layer. In some examples, curing the latex polymer comprises evaporating all of the water from the ink layer so that no water remains in the ink layer.

In some examples, curing the latex polymer comprises evaporating at least a portion of the co-solvent comprises evaporating a major amount of the co-solvent of the inkjet ink composition printed as the ink layer from the ink layer. In some examples, evaporating at least a portion of the co-solvent comprises evaporating at least about 80 wt % of the first solvent, at least about 90 wt % of the first solvent, at least about 95 wt % of the first solvent, or at least about 99 wt % of the of the first solvent comprised in the inkjet ink composition printed as the ink layer.

In some examples, the second and/or third solvent is not evaporated from the ink layer during curing of the latex polymer. In some examples, at least a portion of the second and/or third solvent remain in the ink layer after curing of the latex polymer.

In some examples, curing the latex polymer comprises heating the latex polymer such that latex polymer particles coalesce to form a latex polymer film. Forming a latex polymer film occurs after evaporation of water from the ink layer and at least partial evaporation of the first solvent. In some examples, forming a latex polymer film occurs after evaporation of water from the ink layer and at least partial evaporation of the first solvent and second and/or third solvent (when present). Forming a latex polymer film may comprise heating the ink layer to a temperature greater that the MFFT of the latex polymer in the ink layer. In some examples, forming a latex polymer film comprises heating the ink layer to a temperature greater that the MFFT of the latex polymer in the ink layer and a temperature less than a temperature which may cause deformation of the print substrate.

In some examples, the method of printing comprises selecting an inkjet ink composition such that the MFFT of the latex polymer is below a temperature which may cause deformation of the print substrate.

Figure 4:
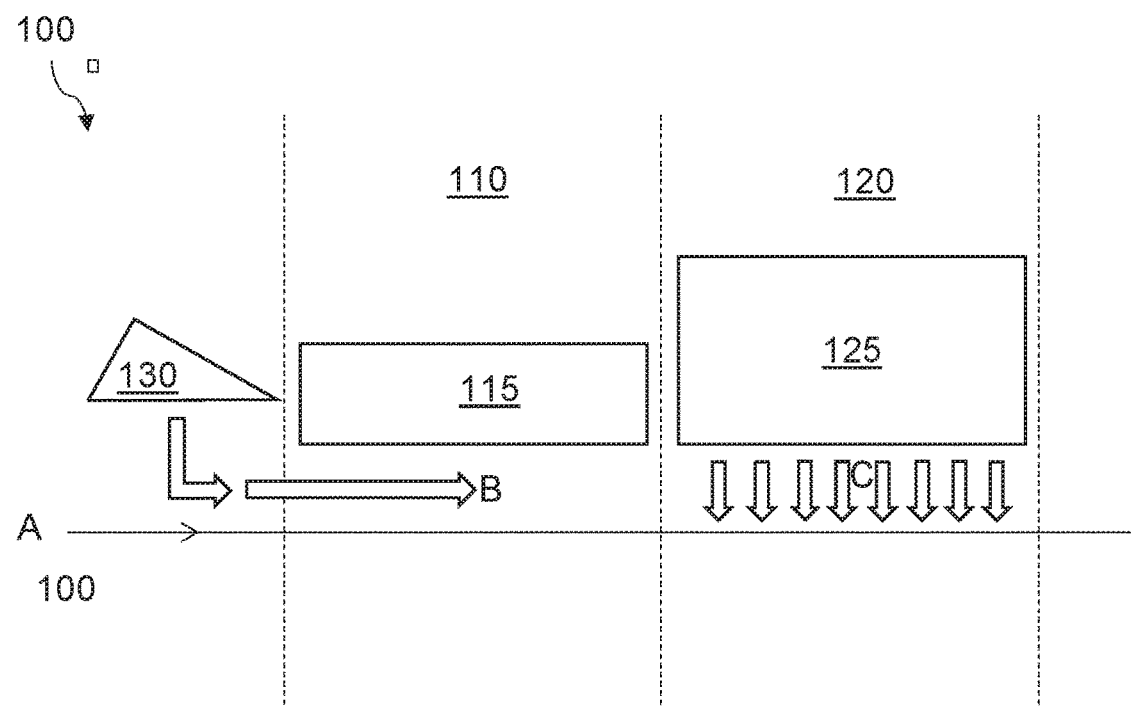
FIG. 4 is a schematic diagram of a printing system for use in an example of a method of printing.

FIG. 4 is a schematic diagram of a printing system 100 comprising an inkjet printer 115 in a printing zone 110 of the printing system 100 and a drier 125 positioned in a curing zone 120 of the printing system 100. A print substrate may be transported through the printing system 100 along the path shown by arrow A such that the print substrate is first fed to the printing zone 110 where an inkjet ink composition is inkjet printed onto the print substrate by the inkjet printer 115 (for example from an inkjet cartridge as described above) to form an ink layer on the print substrate. The ink layer disposed on the print substrate may then be heated in the printing zone 110 (for example, the air temperature in the printing zone may range between 10° C. and 90° C.) such that water may be evaporated from the ink layer. The print substrate may then be transported to the curing zone 120 where the ink layer is heated (for example, the air temperature in the printing zone may range between 10° C. and 140° C.) and air is blown onto the print substrate (as shown by arrows C) such that the first and optionally the second and/or third solvent are at least partially evaporated from the ink layer and the latex polymer is heated to a temperature above the MFFT of the latex polymer in the ink layer. In some examples, the printing system 100 comprises a fan 130 for blowing air over the print substrate passing through the printing zone 110 to evaporate water from the inkjet layer.

EXAMPLES

The following illustrates examples of the compositions and related aspects described herein. Thus, these examples should not be considered to restrict the present disclosure, but are merely in place to teach how to make examples of compositions of the present disclosure.

Inkjet ink compositions were prepared by combining different ink vehicles with a latex polymer to investigate the effect of the composition of the ink vehicle on the minimum film formation temperature (MFFT) of the latex polymer.

The latex polymer used in Reference Examples 1 and 2 and Examples 3-19 was prepared as follows. Water (169 g) was heated to 77° C. with mechanical agitation. An aqueous emulsion comprised of water (13.7 g), copolymerizable surfactant Hitenol® BC-10 (0.70 g) (Dai-Ichi Kogyo Seiyaku™ Co., Ltd), styrene (17.7 g) and butyl acrylate (37.5 g) was prepared. At 77° C., 2 g (3%) of this monomer emulsion was added to the reactor followed by 0.37 g potassium persulfate (dissolved in a minimal amount of water). After 15 minutes, this monomer mixture was added to the reactor over 72 minutes. When the first polymerization was completed, a second emulsion comprised of water (34.9 g), copolymerizable surfactant Hitenol® BC-10 (1.6 g), styrene (21.1 g), methyl methacrylate (99.0 g), butyl acrylate (6.1 g) and methacrylic acid (2.6 g) was added over 168 minutes. Residual monomer was reduced by typical methodology; i.e., using ascorbic acid and t-butyl hydroperoxide. After cooling to near ambient temperature, pH was adjusted to about 8 with dilute potassium hydroxide; inkjet suitable aqueous biocides were added. The two monomer compositions' average homopolymer refractive indices were 1.5±0.2. The resulting acrylic latex was 41% solids; particle size 0.23µ; viscosity <50 cps.

The co-solvents used in the compositions of Reference Examples 1 and 2 and Examples 3-19 are set out in Table 3 below (amounts specified as wt % by total weight of each composition). Each of these compositions contained 10 wt % latex polymer by total weight of the composition, the amount of co-solvent as set out in Table 3 below, 0.2 wt % non-ionic surfactant as a wetting agent, with the balance being water. The composition of Reference Example 1 contained 10 wt % latex polymer in water (i.e. no co-solvent).

The first solvent used in these examples was 1,2-butanediol. The second solvent used in these examples was Dowanol™ TPM. The third solvent used in these examples is shown in Table 3.

The MFFT of the latex polymer in each of the compositions of Reference Examples 1 and 2 and Examples 3-19 was determined using Rhopoint™ MFFT Bar 90 tool and according to ASTM D2354. The MFFT of the latex polymer in water alone was found to be greater than 90° C. However, the temperature limit of the Rhopoint™ MFFT Bar 90 tool used is 90° C. The glass transition temperature of the latex polymer was determined to be 91° C. The present inventors understand that the MFFT of a latex polymer in water alone is approximately the same as the glass transition temperature (Tg) of the latex polymer.

TABLE 3

| Example | Amount of $1^{st}$ solvent (wt %) | Amount of $2^{nd}$ solvent (wt %) | Third Solvent | Amount of $3^{rd}$ solvent | MFFT (° C.) |
|---|---|---|---|---|---|
| 1 (Ref) | 0 | 0 | 0 | 0 | >90 |
| 2 (Ref) | 18 | 0 | 0 | 0 | 52 |
| 3 | 18 | 2 | 0 | 0 | 42.8 |
| 4 | 18 | 2 | 0 | 0 | 42.0 |
| 5 | 18 | 2 | Eastman ™ 168 | 0.75 | 41.1 |
| 6 | 18 | 2 | Texanol ™ Ester Alcohol | 0.75 | 39.7 |
| 7 | 18 | 2 | Hexamoll ™ DINCH ™ | 0.75 | 36.8 |

TABLE 3-continued

| Example | Amount of 1st solvent (wt %) | Amount of 2nd solvent (wt %) | Third Solvent | Amount of 3rd solvent | MFFT (° C.) |
|---|---|---|---|---|---|
| 8 | 18 | 2 | Eastman ™ TXIB | 0.75 | 36.6 |
| 9 | 18 | 2 | Eastman ™ EEH | 0.75 | 36.4 |
| 10 | 18 | 2 | Benzoflex ™ 2088 | 0.75 | 35.6 |
| 11 | 18 | 2 | Triethyl citrate | 0.75 | 33.3 |
| 12 | 18 | 2 | Benzoflex ™ LA-705 | 0.75 | 33.3 |
| 13 | 18 | 2 | tris(2-butoxyethyl)phosphate | 0.75 | 32.8 |
| 14 | 18 | 2 | Velate ™ 368 | 0.75 | 31.5 |
| 15 | 18 | 2 | Loxanol ™ CA5310 | 0.75 | 30.5 |
| 16 | 18 | 2 | Benzoflex ™ 50 | 0.75 | 28.1 |
| 17 | 18 | 2 | Optifilm ™ 400 | 0.75 | 28.1 |
| 18 | 18 | 2 | triethyl glycol bis(2-ethylhexanoate) | 0.75 | 27.4 |
| 19 | 18 | 2 | dibutyl sebacate | 0.75 | 27.2 |

The results provided in table 3 shown that the MFFT of a latex polymer can be substantially decreased using an ink vehicle as described herein. The present inventors have found that this reduction in MFFT allows the inkjet ink composition described herein to be printed and cured on a much wider range of non-porous media (such as non-porous media including polypropylene and polyethylene which may warp at high temperatures) due to the MFFT reduction provided by the solvent blend.

The present inventors have found that the ink compositions described herein allow for fast drying and curing of the latex polymer at low temperature on non-porous media. The combination of the first solvent with the second solvent and/or third solvent has been found to allow for fast drying of the ink along with reduced MFFT allowing the latex polymer to be cured on a range of substrates.

Pigmented inkjet ink compositions were also prepared according to Examples 3-19 except that each inkjet ink composition contained 10 wt % latex polymer, 3 wt % pigment, co-solvent as listed in table 3 above with the balance being water. These composition were used to print images and which were cured at low temperatures and the composition were found to show excellent decap performance.

The present inventors have also found that the ink vehicles described herein provide inkjet ink compositions showing excellent decap performance.

While the compositions, methods and related aspects have been described with reference to certain examples, it will be appreciated that various modifications, changes, omissions, and substitutions can be made without departing from the spirit of the disclosure. It is intended, therefore, that the ink compositions, methods and related aspects be limited only by the scope of the following claims. Unless otherwise stated, the features of any dependent claim can be combined with the features of any of the other dependent claims, and any other independent claim.

The invention claimed is:

1. An inkjet ink composition comprising:
a latex polymer comprising a copolymer comprising cycloaliphatic monomers and aromatic monomers, wherein the cycloaliphatic monomers comprise cycloaliphatic (meth)acrylate monomers or cycloaliphatic (meth)acrylamide monomers and the aromatic monomers comprise aromatic (meth)acrylate monomers or aromatic (meth)acrylamide monomers; and
an ink vehicle comprising:
water; and
a co-solvent comprising:
a first solvent having a boiling point in the range of about 170° C. to about 215° C., and present in an amount from about 10 wt % to about 40 wt % by total weight of the inkjet ink composition; and
a second solvent having a boiling point of about 220° C. or more, and present in an amount from about 0.1 wt % to about 8 wt % by total weight of the inkjet ink composition.

2. The inkjet ink composition according to claim 1, wherein the first solvent is selected from the group consisting of 1,2-propanediol, 1,2-butanediol, ethylene glycol, 2-methyl-2,4-pentanediol, 1,3-butanediol, 2-methyl-1,3-propanediol and 1,3-propanediol.

3. The inkjet ink composition according to claim 1, wherein the inkjet ink composition comprises from about 0.5 wt % to about 8 wt % of the second solvent, and wherein the boiling point of the second solvent is in the range of about 220° C. to about 285° C.

4. The inkjet ink composition according to claim 1, wherein the inkjet ink composition comprises from about 0.1 wt % to about 4 wt % of the second solvent, wherein the boiling point of the second solvent is greater than about 285° C., and wherein the second solvent is insoluble in water.

5. The inkjet ink composition according to claim 1, wherein the inkjet ink composition comprises:
from about 0.5 wt % to about 8 wt % of the second solvent, wherein the boiling point of the second solvent is in the range of about 220° C. to about 285° C.; and
from about 0.1 wt % to about 4 wt % of a third solvent having a boiling point of greater than about 285° C., wherein the third solvent is insoluble in water.

6. An inkjet cartridge comprising:
an inkjet ink composition comprising:
a latex polymer comprising a copolymer comprising cycloaliphatic monomers and aromatic monomers, wherein the cycloaliphatic monomers comprise cycloaliphatic (meth)acrylate monomers or cycloaliphatic (meth)acrylamide monomers and the aromatic monomers comprise aromatic (meth)acrylate monomers or aromatic (meth)acrylamide monomers; and
an ink vehicle comprising:
water; and
a co-solvent comprising:
a first solvent having a boiling point in the range of about 170° C. to about 215° C.; and
a second solvent having a boiling point of about 220° C. or more; and
an ink ejection device comprising a recirculation system.

7. The inkjet cartridge according to claim 6, wherein the recirculation system comprises:
- a drop generator;
- a recirculation channel including an inlet channel, an outlet channel and a connection channel; and
- an ink slot to supply the inkjet ink composition to the drop generator via the inlet channel and the outlet channel of the recirculation channel.

8. The inkjet cartridge according to claim 6, wherein:
- the first solvent is present in an amount ranging from about 10 wt % to about 40 wt % by total weight of the inkjet ink composition; and
- the second solvent is present in an amount ranging from about 0.1 wt % to about 8 wt % by total weight of the inkjet ink composition.

9. A method of printing comprising:
- providing a non-porous print substrate;
- providing an inkjet ink composition comprising:
  - a latex polymer comprising a copolymer comprising cycloaliphatic monomers and aromatic monomers, wherein the cycloaliphatic monomers comprise cycloaliphatic (meth)acrylate monomers or cycloaliphatic (meth)acrylamide monomers and the aromatic monomers comprise aromatic (meth)acrylate monomers or aromatic (meth)acrylamide monomer; and
  - an ink vehicle, wherein the ink vehicle comprises water and a co-solvent comprising a first solvent having a boiling point in the range of about 170° C. to about 215° C. and a second solvent having a boiling point of about 220° C. or more;
- inkjet printing the inkjet ink composition to the non-porous print substrate to form an inkjet ink layer disposed on the non-porous print substrate; and
- heating the ink layer to cure the latex polymer at a temperature such that the temperature of the non-porous print substrate does not exceed a temperature of about 70° C.

10. The method according to claim 9, wherein curing the latex polymer comprises evaporating water from the inkjet ink composition printed as the ink layer and at least partially evaporating the first solvent from the inkjet ink composition printed as the ink layer.

11. The method according to claim 9, wherein curing the latex polymer comprises heating the latex polymer to a temperature greater than the minimum film formation temperature of the latex polymer in the ink layer.

* * * * *